(12) United States Patent
Taub et al.

(10) Patent No.: US 7,838,755 B2
(45) Date of Patent: Nov. 23, 2010

(54) MUSIC-BASED SEARCH ENGINE

(75) Inventors: Robert D. Taub, Princeton, NJ (US); J. Alexander Cabanilla, New York, NY (US); George Tourtellot, Morganville, NJ (US)

(73) Assignee: MuseAmi, Inc., Princeton, NJ (US)

( * ) Notice: Subject to any disclaimer, the term of this patent is extended or adjusted under 35 U.S.C. 154(b) by 0 days.

(21) Appl. No.: 12/031,654

(22) Filed: Feb. 14, 2008

(65) Prior Publication Data

US 2008/0190272 A1 Aug. 14, 2008

Related U.S. Application Data

(60) Provisional application No. 61/028,490, filed on Feb. 13, 2008, provisional application No. 60/889,816, filed on Feb. 14, 2007, provisional application No. 60/889,821, filed on Feb. 14, 2007.

(51) Int. Cl.
G10H 1/00 (2006.01)
(52) U.S. Cl. ............................. 84/609; 84/616; 84/649
(58) Field of Classification Search ........... 84/600–602, 84/609, 616, 649, 654
See application file for complete search history.

(56) References Cited

U.S. PATENT DOCUMENTS

| | | | |
|---|---|---|---|
| 4,014,237 A | 3/1977 | Milde, Jr. | |
| 4,028,985 A | 6/1977 | Merritt | |
| 4,399,732 A | 8/1983 | Rothschild et al. | |
| 4,665,790 A | 5/1987 | Rothschild | |
| 4,895,060 A | 1/1990 | Matsumoto | |
| 4,926,737 A * | 5/1990 | Minamitaka | ................. 84/611 |
| 4,945,804 A | 8/1990 | Farrand | |
| 4,960,031 A | 10/1990 | Farrand | |
| 4,999,773 A * | 3/1991 | Clynes | ........................ 84/622 |
| 5,038,658 A | 8/1991 | Tsuruta et al. | |
| 5,292,125 A | 3/1994 | Hochstein et al. | |

(Continued)

FOREIGN PATENT DOCUMENTS

DE 10117870 A1 10/2002

(Continued)

OTHER PUBLICATIONS

Brossier, Paul M., et al. "Fast labeling of notes in music signals", ISMIR 2004, Oct. 14, 2004, Barcelona, Spain; Abstract, Sections 2 and 3.

(Continued)

*Primary Examiner*—David S. Warren
(74) *Attorney, Agent, or Firm*—Townsend and Townsend and Crew LLP

(57) ABSTRACT

Methods, systems, and devices are described for music-based searching. Embodiments of the invention receiving music queries that specify music elements, the queries using textual, audio, and/or score data. The music queries may be used to generate search parameters based on the specified music elements, which may in some cases be weighted. The search parameters may then be directing against a database comprising data records, each data record being associated with a music piece and a set of music elements relating to the music piece. Matching data records in the database may then be identified based on music elements common between the search parameters and the associated music piece. Search output may then be ranked, displayed, and output in various ways.

14 Claims, 14 Drawing Sheets

U.S. PATENT DOCUMENTS

| | | | |
|---|---|---|---|
| 5,325,423 A | 6/1994 | Lewis | |
| 5,488,196 A | 1/1996 | Zimmerman et al. | |
| 5,544,228 A | 8/1996 | Wagner et al. | |
| 5,646,361 A | 7/1997 | Morrow | |
| 5,685,775 A | 11/1997 | Bakoglu et al. | |
| 5,695,400 A | 12/1997 | Fennell et al. | |
| 5,704,007 A | 12/1997 | Cecys | |
| 5,728,960 A | 3/1998 | Sitrick | |
| 5,768,350 A | 6/1998 | Venkatakrishnan | |
| 5,792,971 A | 8/1998 | Timis et al. | |
| 5,806,039 A | 9/1998 | Fukada et al. | |
| 5,808,225 A | 9/1998 | Corwin et al. | |
| 5,820,384 A | 10/1998 | Tubman | |
| 5,820,463 A | 10/1998 | O'Callaghan | |
| 5,824,937 A | 10/1998 | Szalay | |
| 5,825,905 A | 10/1998 | Kikuchi | |
| 5,864,631 A | 1/1999 | Shutoh | |
| 5,869,782 A | 2/1999 | Shishido et al. | |
| 5,886,274 A | 3/1999 | Jungleib | |
| 5,929,360 A | 7/1999 | Szalay | |
| 5,982,816 A | 11/1999 | Ogita et al. | |
| 5,983,280 A | 11/1999 | Hunt | |
| 6,067,566 A | 5/2000 | Moline | |
| 6,084,168 A | 7/2000 | Sitrick et al. | |
| 6,121,530 A * | 9/2000 | Sonoda | 84/609 |
| 6,140,568 A | 10/2000 | Kohler | |
| 6,156,964 A | 12/2000 | Sahai et al. | |
| 6,175,872 B1 | 1/2001 | Neumann et al. | |
| 6,188,010 B1 * | 2/2001 | Iwamura | 84/609 |
| 6,201,176 B1 * | 3/2001 | Yourlo | 84/609 |
| 6,212,534 B1 | 4/2001 | Lo et al. | |
| 6,313,387 B1 | 11/2001 | Yamauchi | |
| 6,417,884 B1 | 7/2002 | Chang et al. | |
| 6,423,893 B1 | 7/2002 | Sung et al. | |
| 6,598,074 B1 | 7/2003 | Moller et al. | |
| 6,653,545 B2 | 11/2003 | Redmann et al. | |
| 6,678,680 B1 * | 1/2004 | Woo | 707/6 |
| 6,703,549 B1 | 3/2004 | Nishimoto et al. | |
| 6,747,201 B2 * | 6/2004 | Birmingham et al. | 84/609 |
| 6,766,288 B1 | 7/2004 | Smith | |
| 6,798,886 B1 | 9/2004 | Smith et al. | |
| 7,050,462 B2 | 5/2006 | Tsunoda et al. | |
| 7,053,291 B1 * | 5/2006 | Villa | 84/609 |
| 7,074,999 B2 | 7/2006 | Sitrick et al. | |
| 7,098,392 B2 | 8/2006 | Sitrick et al. | |
| 7,227,072 B1 * | 6/2007 | Weare | 84/609 |
| 7,230,176 B2 | 6/2007 | Kosonen | |
| 7,254,644 B2 | 8/2007 | Norimatsu et al. | |
| 7,272,551 B2 | 9/2007 | Sorin | |
| 7,277,852 B2 * | 10/2007 | Iyoku et al. | 704/236 |
| 7,288,710 B2 * | 10/2007 | Gayama | 84/609 |
| 7,295,977 B2 * | 11/2007 | Whitman et al. | 704/236 |
| 7,297,858 B2 | 11/2007 | Paepcke | |
| 7,323,629 B2 | 1/2008 | Somani et al. | |
| 7,342,167 B2 * | 3/2008 | Cremer et al. | 84/611 |
| 7,368,652 B2 * | 5/2008 | Iketani et al. | 84/609 |
| 7,371,954 B2 | 5/2008 | Masuda et al. | |
| 7,405,355 B2 | 7/2008 | Both et al. | |
| 7,423,213 B2 | 9/2008 | Sitrick | |
| 7,473,838 B2 | 1/2009 | Suzuki et al. | |
| 7,507,899 B2 | 3/2009 | Sumita | |
| 7,544,881 B2 * | 6/2009 | Makino et al. | 84/615 |
| 7,547,840 B2 | 6/2009 | Noh et al. | |
| 2001/0007960 A1 | 7/2001 | Yoshihara et al. | |
| 2001/0023633 A1 | 9/2001 | Matsumoto | |
| 2002/0007721 A1 | 1/2002 | Aoki | |
| 2002/0091847 A1 | 7/2002 | Curtin | |
| 2003/0089216 A1 * | 5/2003 | Birmingham et al. | 84/609 |
| 2003/0164084 A1 | 9/2003 | Redmann et al. | |
| 2003/0188626 A1 | 10/2003 | Kriechbaum et al. | |
| 2004/0040433 A1 | 3/2004 | Errico | |
| 2005/0015258 A1 | 1/2005 | Somani et al. | |
| 2005/0066797 A1 | 3/2005 | Miyamoto et al. | |
| 2005/0086052 A1 | 4/2005 | Shih | |
| 2005/0190199 A1 | 9/2005 | Brown et al. | |
| 2005/0234366 A1 | 10/2005 | Heinz et al. | |
| 2006/0050898 A1 | 3/2006 | Yamada et al. | |
| 2006/0065105 A1 * | 3/2006 | Iketani et al. | 84/609 |
| 2006/0065107 A1 | 3/2006 | Kosonen | |
| 2006/0075883 A1 * | 4/2006 | Thorne et al. | 84/616 |
| 2006/0095254 A1 | 5/2006 | Walker et al. | |
| 2006/0150803 A1 | 7/2006 | Taub | |
| 2006/0150805 A1 | 7/2006 | Pang | |
| 2007/0012165 A1 | 1/2007 | Noh et al. | |
| 2007/0039449 A1 | 2/2007 | Redmann | |
| 2007/0044639 A1 | 3/2007 | Farbood et al. | |
| 2007/0076534 A1 | 4/2007 | Shih | |
| 2007/0076902 A1 | 4/2007 | Master | |
| 2007/0107584 A1 * | 5/2007 | Kim et al. | 84/612 |
| 2007/0131094 A1 * | 6/2007 | Kemp | 84/609 |
| 2007/0140510 A1 | 6/2007 | Redmann | |
| 2007/0208990 A1 * | 9/2007 | Kim et al. | 715/500.1 |
| 2007/0214941 A1 * | 9/2007 | Kourbatov | 84/609 |
| 2007/0256551 A1 | 11/2007 | Knapp et al. | |
| 2008/0060499 A1 | 3/2008 | Sitrick | |
| 2008/0113797 A1 | 5/2008 | Egozy | |
| 2008/0115656 A1 | 5/2008 | Sumita | |
| 2008/0188967 A1 | 8/2008 | Taub et al. | |
| 2008/0190271 A1 | 8/2008 | Taub et al. | |
| 2008/0190272 A1 | 8/2008 | Taub et al. | |
| 2008/0210082 A1 | 9/2008 | Sumita | |
| 2008/0271592 A1 | 11/2008 | Beckford | |
| 2009/0171485 A1 | 7/2009 | Sim et al. | |

FOREIGN PATENT DOCUMENTS

| | | | |
|---|---|---|---|
| DE | 102004033829 A1 | 2/2006 | |
| DE | 102004033867 A1 | 2/2006 | |
| EP | 1736961 A | 12/2006 | |
| JP | 3249799 A | 11/1991 | |
| JP | 2003-187186 A | 7/2003 | |
| WO | WO03/005242 A1 | 1/2003 | |
| WO | WO2004/034375 A1 | 4/2004 | |
| WO | WO2004/057495 A1 | 7/2004 | |
| WO | WO2006/066075 A1 | 6/2006 | |

OTHER PUBLICATIONS

Brossier, Paul M., et al. "Real-time temporal segmentation of note objects in music signals", ICMC 2004, Nov. 6, 2004, Miami, Florida; Abstract, Sections 2 and 3.

Ghias, Asif, et al. "Query By Humming", *Proceedings of ACM Mutlmedia '95 San Francisco*, Nov. 5-9, 1995, pp. 231-236; XP000599035.

"Head and Stem Extraction from Printed Music Scores Using a Neural Network Approach" by H. Miyao et al., in Proceedings of Third International Conference on Document Analysis and Recognition, IEEE Computer Society (1995) at 1074-1079.

Hori, T., et al. "Automatic Music Score Recognition/Play System Based on Decision Based Neural Network", *1999 IEEE Third Workshop on Multimedia Signal Processing* (Cat. No. 99TH8451:183-4.

Nagoshi, Yasuo, et al. "Transcription of Music Composed of Melody and Chord Using Tree-structured Filter Banks", *Proceedings of the IASTED International Conference Signal and Imaging Processing* Aug. 13-16, 2001 Honolulu, Hawaii, pp. 415-419.

McNab, Rodger J., et al. "Signal Processing for Melody Transcription", *Proceedings of the 19th Australasian Computer Science Conference*, Melbourne, Australia, Jan. 31-Feb. 2, 1996, vol. 18(1)301-207.

Su, M., et al. "A Neural-Network-Based Approach to Optical Symbol Recognition", *Neural Processing Letters* (2002) 15:117-135.

Velikic, Gordana, et al. "Musical Note Segmentation Employing Combined Time and Frequency Analyses", *Acoustics, Speech, and Signal Processing, 2004, Proceedings* (2004) vol. 4:277-280.

"eJamming Features" [Online] Feb. 7, 2007; EJAMMING.COM, XP002483894, retrieved from the Internet: on Jun. 11, 2008; URL:web.archive.org/web/20070207122807/www.ejamming.com.

"Ninjam—Realtime Music Collaboration Software" [Online] Feb. 14, 2006; NINJAM.ORG, XP002483895, retrieved from the Internet on Jun. 11, 2008; URL:web.archive.org/web20060214020741/ninjam.org.

"About MyVirtualBand" [Online] Jan. 2, 2007, MYVIRTUALBAND.COM, XP002483896; retrieved from the Internet on Jun. 11, 2008; URL: web.archive.org/web/20070102035042/www.myvirtualband.com.

Thalman, Florian, et al. "Jam Tomorrow: Collaborative Music Generation in Croquet Using OpenAI", *Proceedings of the Fourth International Conference on Creating, Connecting and Collaborating through Computing (C5'06)*, Jan. 1, 2006, pp. 73-78.

Beran et al., "Recognition of Printed Music Score", Lecture Notes in Computer Science. Jan. 1999, pp. 174-179.

International Search Report dated Jul. 31, 2009 from International Application No. PCT/US2009/034149, 3 pages.

\* cited by examiner

US 7,838,755 B2

MUSIC-BASED SEARCH ENGINE

CROSS REFERENCES

This application claims the benefit of priority from U.S. Provisional Patent Application No. 60/889,816, filed Feb. 14, 2007, entitled "COLLABORATIVE MUSIC SHARING", and from U.S. Provisional Patent Application No. 60/889,821, filed Feb. 14, 2007, entitled "MUSIC-BASED SEARCH ENGINE", which are hereby incorporated by reference, as if set forth in full in this document, for all purposes. This application claims the priority benefit of U.S. Provisional Patent Application No. 61/028,490 filed Feb. 13, 2008 entitled "MUSIC SCORE DECONSTRUCTION" to Robert D. Taub, et al. Priority of the provisional application filing date is claimed and the disclosure of the provisional application is incorporated herein by reference for all purposes.

This is application is further related to co-pending U.S. Patent Application No. 12/031,510 filed Feb. 14, 2008, entitled "COLLABORATIVE MUSIC CREATION", which is filed concurrently herewith and hereby incorporated by reference, as if set forth in full in this document, for all purposes.

BACKGROUND

The present invention relates to audio applications in general and, in particular, to music-based searching.

Often, it may be desirable to find an audio sample, an album track, or other audio information when textual information about the audio (e.g., artist, title, etc.) is unknown. For example, after hearing a song on the radio, a person may wish to find the song on the Internet. If the person recalls the melody but does not know the name of the song, lyrics from the song, or even the artist, it may be very difficult to find the song using traditional (e.g., text-based) search engines.

Some existing search engines may provide the capability to organize audio compositions based on metadata manually supplied to a database about the audio composition. For example, it may be possible to provide a database with information relating to a song's genre, tempo, pitch sequence, pitch interval sequence, release date, artist, etc. This information may then be used by traditional search engines to help locate the particular song. To provide this capability, however, requires manually (and often subjectively) determining information about the audio composition and storing the information to a database. This may be prone to inefficiencies, inaccuracies, and limitations regarding what types of information are available.

Some existing search engines may further provide the capability to extract metadata from certain types of audio files. For example, the MPEG-7 file format and other file formats may be configured to store certain types of information about the audio content. A search engine may then be able to extract that information, for example, from the file's header information.

Yet other existing search engines may provide the capability to group songs by one particular high-level pattern. For example, high-level rhythmic signatures may be extracted from the envelopes of the audio signals, and those high-level signatures may be used to group songs. This may eliminate the need to manually enter certain types of information, but may still limit the search. One limitation is that the search may be restricted to a single, non-textual dimension. For example, the user may only be able to search on rhythmic signature, while millions of songs may share similar rhythmic signatures. Another limitation is that the single dimension may not be sufficiently elemental to provide useful results. For example, the user may wish to hum the melody of the chorus or drum out a portion of the rhythm, neither of which may be searchable against high-level patterns.

For at least these reasons, it may be desirable to provide improved capabilities for music search.

SUMMARY

Among other things, methods, systems, and devices are described for music-based searching.

Embodiments of the invention provide a variety of features and functionality. Some embodiments accept different types of search input (e.g., text, audio, score images, etc.) and generate different types of search output (e.g., textual lists, audio output, score output, etc.). Other embodiments of the invention support intelligent parsing of textual information, deconstruction of audio and score image data to generate music elements, orthogonal and weighted searching capabilities, and many other functions. Other embodiments are configured to operate locally (e.g., personal computers or local-area networks); while in other embodiments, the invention is configured to operate remotely (e.g., over the Internet or using remote servers). Other embodiment support output functionality, including generation of text, score, audio output of search results.

In one embodiment, a computer method of performing a music search is provided. The method includes receiving a music query that specifies a music element; generating a set of search parameters based on the music element specified by the received music query; directing the set of search parameters against a database including a number of data records, each data record being associated with a music piece and a set of music elements relating to the music piece, wherein the set of music elements associated with at least one data record includes data deconstructed from the at least one music piece; identifying a set of matching data records in the database, the set of matching data records including data records that match the set of search parameters; identifying a set of matched music pieces in the database, the set of matched music pieces including music pieces that are associated with the set of matching data records; and producing search output comprising the matched music pieces arranged in a ranked list.

Other features and advantages of the present invention should be apparent from the following description of preferred embodiments that illustrate, by way of example, the principles of the invention.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This description provides example embodiments only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, and software may individually or collectively be components of a larger system, wherein other procedures may take precedence over or otherwise modify their application. Also, a number of steps may be required before, after, or concurrently with the following embodiments.

Overview

Embodiments of the present invention provide novel functionality relating to music-based searching. In one aspect, techniques of the invention can be implemented as a network site, such as a Web portal or an intranet (LAN) site. In other aspects, the invention may be provided as client-side software, as add-on functionality to existing search environments, or as dedicated devices and systems.

Embodiments of the invention provide a variety of features and functionality. Some embodiments accept different types of search input (e.g., text, audio, score images, etc.) and generate different types of search output (e.g., textual lists, audio output, score output, etc.). In certain embodiments, the invention supports intelligent parsing of textual information, deconstruction of audio and score image data to generate music elements, orthogonal and weighted searching capabilities, and many other functions. Some embodiments of the invention are configured to operate locally (e.g., personal computers or local-area networks); while other embodiments are configured to operate remotely (e.g., over the Internet or using remote servers). Still other embodiments support output functionality, including generation of text, score, audio output of search results.

Figure 1:
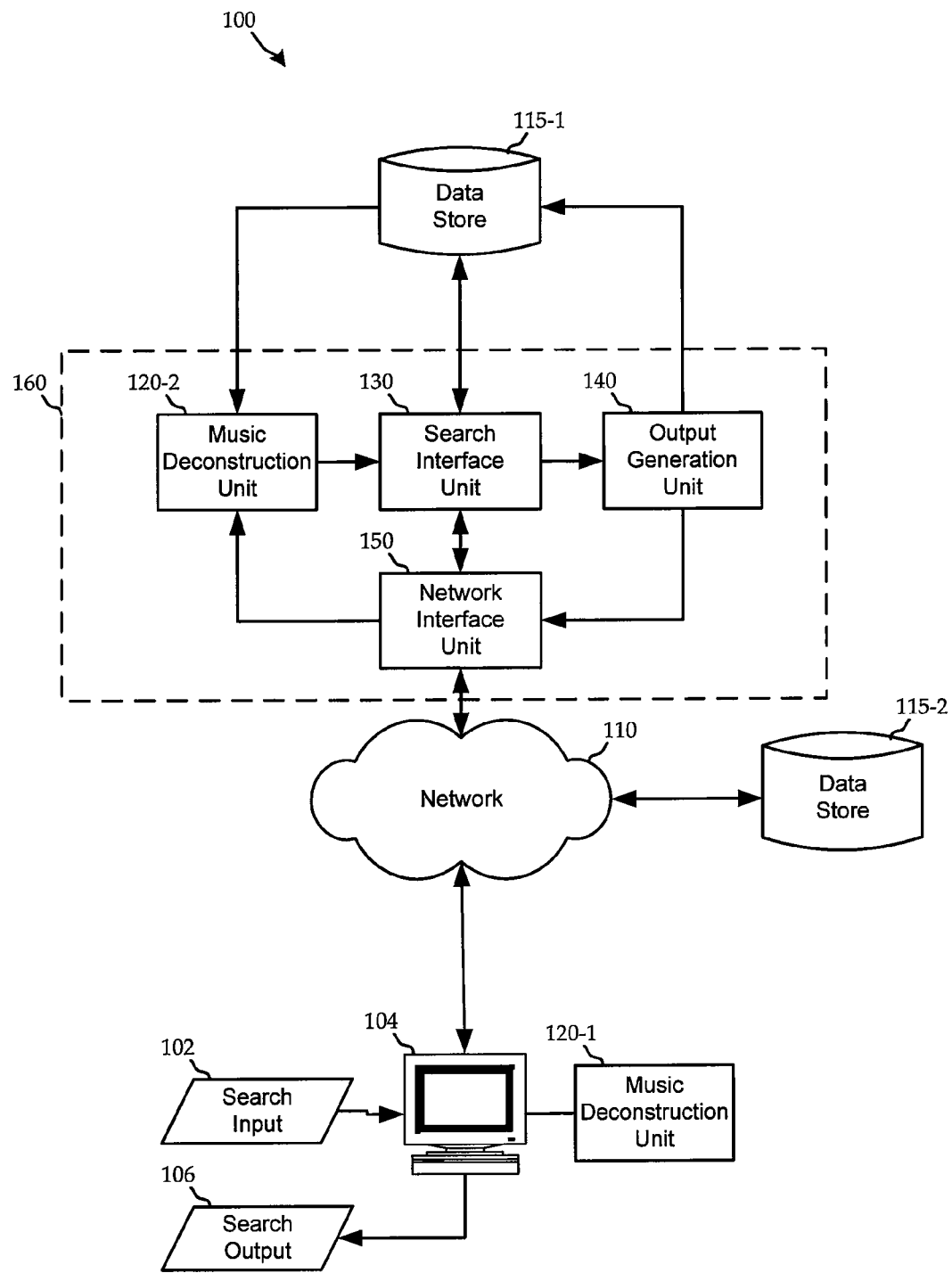
FIG. 1 shows a high-level simplified block diagram of a system constructed in accordance with the invention for music-based searching.

FIG. 1 shows a high-level simplified block diagram of a system 100 constructed in accordance with the invention for music-based searching. The system 100 includes a search engine 160 connected to a number of workstations 104 via a network 110. The workstations 104 may access the search engine through a user interface. The network 110 may be any facilitator of communication between the number of workstations 104. For example, the network 110 may be the Internet or a local area network (LAN). In certain embodiments, the search engine 160 may be resident on a workstation 104 [(not shown)] and may be configured to search for data resident on or remote to the workstation 104.

The workstation 104 may be any device or system configured to communicate with the network 110 and to receive search input 102. In some embodiments, the workstation 104 is a multi-purpose device. For example, the workstation 104 may be a computer (e.g., a laptop, a desktop, etc.) or a hand-held device (e.g., a personal digital assistant, a cellular telephone, etc.). In other embodiments, the workstation 104 is a dedicated device. For example, the workstation 104 may be a dedicated portable device developed specifically for providing a music-based search engine, including receiving search input 102, communicating with the network 110, and generating search output 106. In certain embodiments, the workstation 104 is or provides interfaces for inputting audio, score information, text, or other information as search input. For example, the workstation 104 may be a direct network interface for an electric guitar, a digital audio component, or a webcam for recording an image of a music score.

It will be appreciated that there are many ways for the workstation 104 to receive search input 102 according to the invention. For example, the search input 102 may be received through an internal or external microphone, a line-level audio port, a file transfer (e.g., from a fixed or removable data store or over a network), a score image capture device, a text field, etc. Music input embodiments are discussed further below. The search input may include a query that is directed against a database to locate matches that include the search engine output.

In some embodiments, the workstation 104 is configured to generate search output 106. In one embodiment, the search output 106 includes audio output configured to be played through a speaker. In another embodiment, the search output 106 includes an audio file configured to be stored, played, and/or shared over a network. In yet another embodiment, the search output 106 includes music element data (e.g., pitches, intervals, tempos, keys, amplitudes, etc.) for use by other compatible systems. In still another embodiment, the search output 106 includes score representation data, configured to be used by score editing software, sent to a document editing or publishing system, or printed. In even another embodiment, the search output 106 includes a one- or multi-dimensional list of search results.

Depending on the type of search input 102, it may be desirable to deconstruct music elements from the search input 102. In one example, search input 102 is received as an audio signal (e.g., a searcher plays a melody line into a microphone using a guitar). In another example, search input 102 is received as a scanned image of a music score. In either example, it may be desirable to deconstruct music elements from the search input 102 to use in generating search parameters. Music (e.g., audio and score) deconstruction is described more fully below.

In some embodiments, the system 100 includes one or more music deconstruction units 120 for providing music deconstruction functionality. In certain embodiments, the music deconstruction unit 120 is resident on the workstation 104. For example, the music deconstruction units 120 may be implemented as client-level software. In these embodiments, the search input 102 may be deconstructed into music elements before being sent over the network 110 to the search engine 160. In other embodiments, a music deconstruction unit 120 may be provided as part of the search engine 160 (e.g., element 120-2). The search input 102 may be received at a workstation 104, sent over the network 110 to the search engine 160, and then deconstructed into music elements at the search engine 160.

In certain embodiments, the search engine 160 may be in operative communication with one or more data stores 115. In some embodiments, the search engine 160 communicates with the data stores 115 over the network 110. In other embodiments, the search engine 160 communicates with the data stores 115 directly. The data stores 115 may be configured to store one or more types of information relating to search input 102 or search output 106. For example, the data stores 115 may be configured to store raw audio files (e.g., files containing digitized audio signal data), encoded audio files (e.g., files containing metadata relating to the file content data or the audio signal data), music element information (e.g., deconstructed music elements stored in a multi-dimensional relational database, associated with their respective music contribution), etc.

It will be appreciated that certain types of data security may be desirable in embodiments of the invention. In some embodiments, the data stores 115 are configured to store data using certain types of data security (e.g., encryption, password protections, etc.). In other embodiments, the physical and virtual communication links between various components of the system 100 are secure (e.g., by secure socket layer encryption). For example, the network communications between the search engine 160 and the workstation 104, or between the search engine 160 and the data stores 115 may be secure. In still other embodiments, the search output 106 may be secured to prevent copying, deleting, etc. For example, certain digital rights management (DRM) techniques may be employed to restrict unauthorized copying or sharing of search output 106 files.

In some embodiments, the search engine 160 communicates with the network 110 through a network interface unit 150. Certain embodiments of the network interface unit 150 facilitate communication between the search engine 160 and the network 110 by providing certain types of network functionality. For example, the network interface unit 150 may route and/or interpret network traffic to allow for effective collaboration, file transfer, and other capabilities of the search engine 160.

Various embodiments of the network interface unit 150 provide enhanced capabilities. In some embodiments, the network interface unit 150 is configured to receive and process login information from workstations 104 via the network 110. In one embodiment, the login information is used to verify a user of a workstation 104 to determine the user's access rights to the search engine 160. The access rights may determine, for example, whether the user can enter the search engine 160, which files the user may access, which functions of the search engine 160 the user may use, etc.

It will be appreciated that many embodiments of the search engine 160 are possible according to the invention. In some embodiments, the search engine 160 is configured to be used through a Web browser, and is locatable at a network address. In certain of these embodiments, the search engine 160 is configured to be extensible to many different browsing environments (e.g., by being written in XML, HTML, or another extensible markup language). In other embodiments, the search engine 160 is implemented as a client-side application that resides on workstation 104. In these embodiments, certain functionality may be implemented on a server (e.g., file management), while much of the search processing is done on a client workstation 104. In yet other embodiments, the search engine 160 may be resident on a separate network server for a local area network, or a workstation 104 may be used to serve the application to the network.

Embodiments of the search engine 160 include a search interface unit 130. In various embodiments, the search interface unit 130 is configured to perform central functions of the search engine 160, including input and query handling, search parameterization, results retrieval and ranking, results display, etc. Embodiments and functions of the search interface unit 130 are described more fully below.

Embodiments of the search engine 160 further include an output generation unit 140. In some embodiments, the output generation unit 140 may be configured to receive output from the search interface unit 130 and generate output data. Data generated by the output generation unit 140 may be communicated to a data store 115 (e.g., directly or over the network 110), or to the workstation 104. In some embodiments, the output data generated by the output generation unit 140 may be search output 106. In other embodiments, the output data generated by the output generation unit 140 may be usable by the workstation 104 for generating search output 106.

Figure 2:
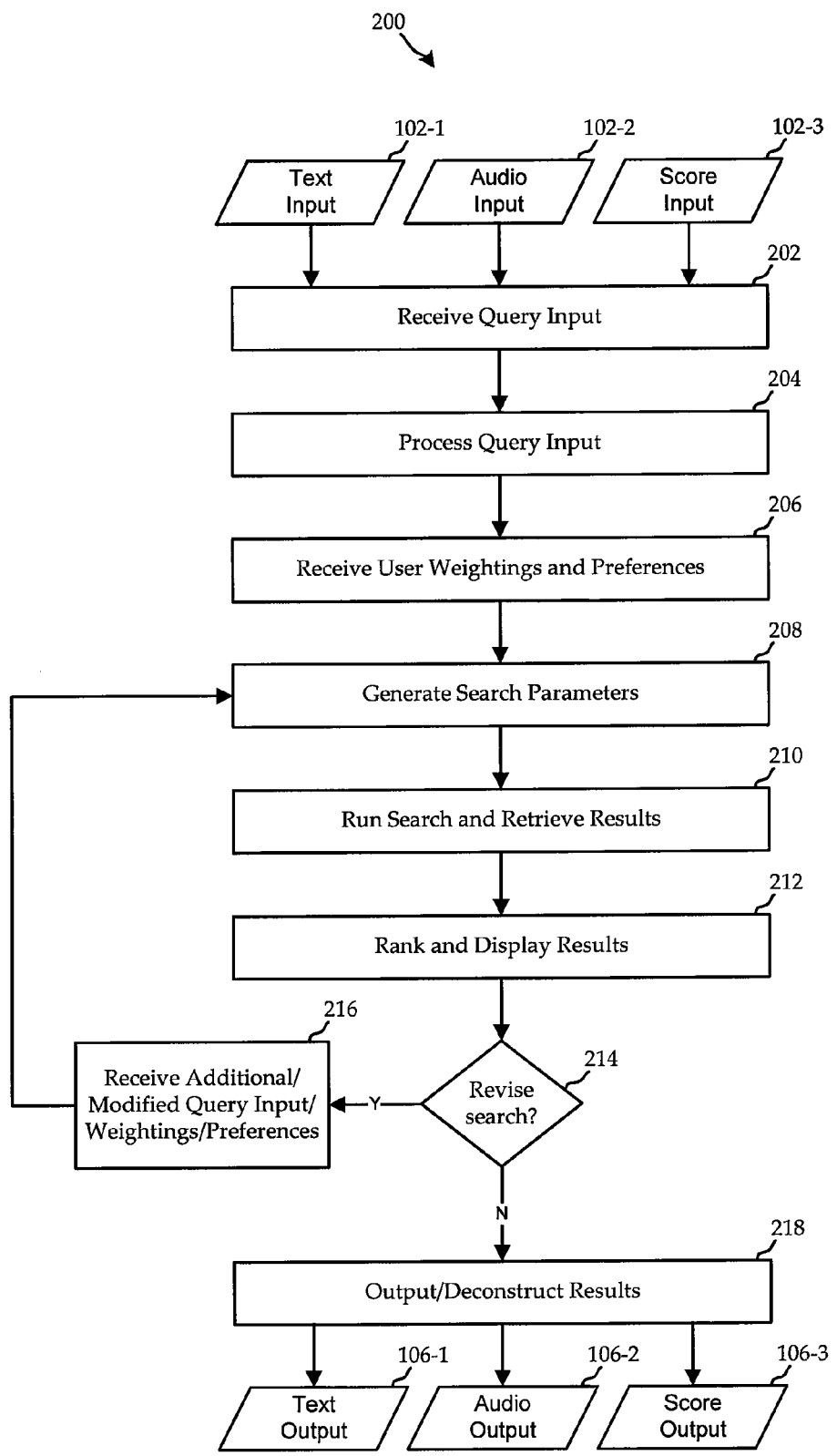
FIG. 2 shows a flow diagram of an exemplary method for music-based searching according to the invention.

FIG. 2 shows a flow diagram of an exemplary method 200 for music-based searching according to the invention. Some embodiments of the method 200 may be performed using a system like the system 100 shown in FIG. 1. The method 200 begins at block 202 by receiving music query input. In various embodiments, the music query input received at block 202 may include text input 102-1, audio input 102-2 (e.g., an audio signal or audio file), and/or score input 102-1 (e.g., a score image or score entry of musical element data).

At block 204, the method 200 processes the query input to generate data for use in music-based searching. In some embodiments, audio input 102-2 or score input 102-3 are deconstructed to generate a set of identifiable musical elements. In other embodiments, text input 102-1 may be parsed and otherwise processed to translate the query into identifiable musical elements. Many other types of processing at block 204 are possible, including, for example, normalizing an audio signal or removing noise to aid in deconstruction, evaluating whether any of the provided information is incompatible or inconsistent with other provided information, etc.

In some embodiments, the method 200 further receives a set of query preferences at block 206. In certain embodiments, the query preferences include a set of weighting preferences for various search elements. For example, a searcher may desire all jazz songs with a tempo of around 100 beats per minute (bpm) and, preferably, a trumpet line. The searcher may search for all those elements, but give the trumpet element a lower weighting. As such, jazz trumpet performances with tempos out of the preferred range may be ranked lower than jazz performances at 100 bpm with no trumpet line.

It will be appreciated that many types of weighting and preferences are possible according to the invention. For example, a searcher may search for information occurring sometime in the first minute of a performance. For another example, a searcher may provide both audio and text inputs (e.g., the searcher plays a melody line into the search engine using a keyboard and tells the search engine to look only in classical music by using a text entry field), and weigh the text inputs more strongly than the audio inputs.

At block 208, the method 200 may use the inputs received at block 202 and the preferences received at block 206 to generate a set of search parameters. In some embodiments, the generation of search parameters at block 208 simply includes translating the data received from blocks 202 and 206. For example, deconstructed music elements, parsed text data, and other information may be translated into a query language to run against a database. In other embodiments, the generation of search parameters at block 208 includes interpreting the data received from blocks 202 and 206. For example, if a searcher whistles a melody into the search engine, the search engine may determine whether the searcher intended to convey a melody, to convey a tempo or rhythm, to convey that the song was performed by whistling, or some other information or combination of information. In still other embodiments, generation of search parameters at block 208 may include, for example, evaluating Boolean operations, converting plain language inputs into query-compatible inputs, etc.

Once the search parameters are generated at block 208, the method 200 may run the search at block 210 and retrieve search results. Embodiments of block 210 may run the search against one or more predefined databases, against networks of data (e.g., data accessible via the Internet), against local data stores, or against any other computer accessible location for searchable music data. Certain embodiments return results by returning actual audio files, while other embodiments return pointers to audio files, textual or score representation information relating to audio files, or any other useful information.

At block 212, the method 200 ranks and displays the results. It will be appreciated that ranking the results may be performed in a number of ways according to the invention. For example, results rankings may relate to confidence values in determining music elements (e.g., in the stored data or in the search input data), the number of parameters that were matched and to what degree, weighting and other preferences supplied by the user or inferred by the search engine, etc.

In some cases, block 212 may produce a results list that is undesirable to the searcher or which does not fit some set of requirements. For example, the list may be uninteresting, too numerous, too short, improperly ordered, etc. from the user's standpoint. As such, at block 214, the method 200 determines whether to revise the search. In some embodiments, the searcher decides to revise the search (e.g., by adding or modifying existing search parameters), while in other embodiments, the search engine automatically revises the search based on result parameters. For example, say a searcher queries the search engine for songs of a certain type played on a guitar, but no search results are returned. The search engine may automatically revise the search to include songs played on other instruments, such as banjos, basses, or sitars. After finding results with the revised search, the search engine may return a notification to the searcher, stating something like: "Your search for "guitar" returned 0 results. Expanding the search to include "banjo" generated 12 results. Click [here] to display "banjo" results." Other automatic search revisions may be generated by the search engine.

If the method 200 determines at block 214 that the search should be revised, new or modified inputs may be received at block 216. These new or modified inputs may be used at blocks 208 through 212 to produce a revised search with new results. Thus, a user may want to submit an additional query comprising new or modified inputs. Searching may therefore be conducted in an iterative manner.

If the method 200 determines at block 214 that the search should not be revised (e.g., the searcher proceeds with the results as received or the results satisfy result parameters), the search results may be output or deconstructed at block 218. In some embodiments, the received results include audio files, score images, or other information. In certain of these embodiments, it may be desirable to deconstruct the results to generate certain output (e.g., textual output relating to certain musical elements 106-1, audio output with certain parameters 106-2, score representation output 106-3, etc.).

It will be appreciated that the embodiments described with respect to FIGS. 1 and 2 are intended to provide an overview of an exemplary construction and exemplary functionality of the invention. As such, the descriptions provided above should not be construed as limiting the scope of the invention. For additional clarity, further descriptions of certain functionality are discussed further below.

Search Input

Figure 3:
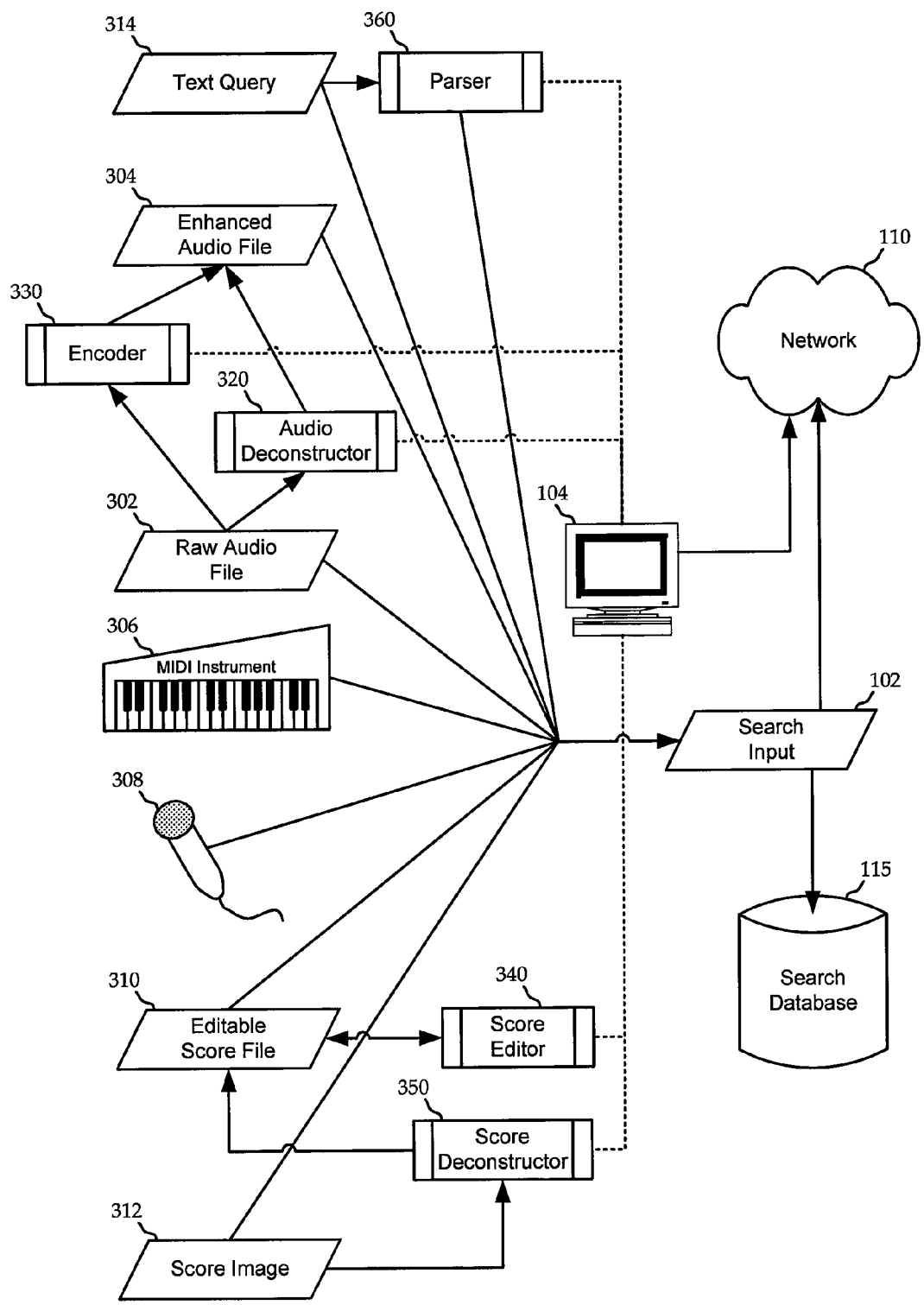
FIG. 3 shows various illustrative types of music inputs for generating an audio search string according to the invention.

Many different types of input are possible for generating a search input. FIG. 3 shows various illustrative types of inputs for generating search input 102 according to the invention. It will be appreciated that the search input devices shown in FIG. 3 provide only some of the many possible search input devices and should not be construed as limiting the capabilities of the invention.

One embodiment of search input includes a raw audio file 302. The raw audio file 302 may include audio signal data that has been digitized into a digital signal representation. For example, the digital signal information may include samples, each having a time stamp and a voltage level, where the samples represent an analog version of the audio signal. In other examples, the digital signal information may be encoded to represent the audio signal algorithmically (e.g., including error correction information, codec information, etc.).

Another embodiment of search input includes an enhanced audio file 304. The enhanced audio file 304 may include information to supplement or supplant the data present in the raw audio file 302. In certain embodiments, the enhanced audio file 304 may include metadata about the contents of the file, its format, or other useful information. For example, the metadata may include information manually entered about the audio file, including a track name, album name, artist name, genre, etc. In another example, the metadata may be compatible with other systems (e.g., the album serial number and the track number for the song may be supplied in metadata to allow a certain database search to return other information about the song, like its title).

Some embodiments of enhanced audio files 304 are created by passing a raw audio file 302 through an encoder 330. For example, an enhanced audio file 304 may be generated by an MPEG-7 encoder, which may use XML to store metadata and to attach metadata to certain timestamps within the enhanced audio file 304. In other embodiments, the enhanced audio file 304 may be generated by passing the raw audio file 302 through an audio deconstructor 320. The audio deconstructor 320 may deconstruct music elements from the raw audio file 302 (as described more fully below) and store them in the enhanced audio file 304.

Yet another embodiment of search input includes digitized output from a compatible instrument 306. In one embodiment, a Musical Instrumental Digital Interface (MIDI) instrument (e.g., a keyboard) is used to generate MIDI data. The MIDI data may include music elements. In some cases, the included music elements may be used to generate other music elements. For example, the MIDI data may include note pitches, which can be analyzed to determine key. In other embodiments, a compatible instrument 306 may be operable to output data in a usable format. For example, a keyboard may have digital coaxial, optical, or other types of outputs that may be compatible with other components.

Still another embodiment of search input includes analog output from a sensor 308. In one embodiment, one or more microphones are used to detect pressure waves generated by one or more instruments and convert them into an analog audio signal. In another embodiment, an electromagnetic pick-up is used to translate the movement in the steel strings of an electric guitar into an analog audio signal.

Even another embodiment of search input includes an editable score file 310. The editable score file 310 may be any type of file which includes editable score data. For example, the editable score file 310 may have been generated using score editing software 340. Some embodiments of search input include score images 312. Embodiments of the score image 312 may include any type of usable digital image. In one embodiment, the score image 312 is a digitized representation of a physical score print-out (e.g., sheet music), created by converting the printed score into a digital image via an image capture device (e.g., a scanner, a digital still or video camera, etc.). In other embodiments, the score image 312 is converted into an editable score file 310 by passing the score image 312 through a score deconstructor 350. The score deconstructor 350 may be operable to deconstruct music elements from the score image, as described more fully below.

Other embodiments of search input include one or more text queries 314. The text query 314 may include any type of text data which may be interpreted as a search query for a music-based search. In one embodiment, the text query 314 includes text formatted in a query language configured to be decoded into search parameters. In another embodiment, the text query 314 includes plain language data. In yet another embodiment, the text query 314 includes other parameters, such as Boolean operators, field names, special characters, etc. In certain embodiments, the text query 314 passes through a text parser 360 or other text processing unit to generate search input.

In certain embodiments, the encoder 330, audio deconstructor 320, score deconstructor 350, score editor 340, text parser 360, or other applications may be resident on a workstation 104, a server computer, or over a network 110. In other embodiments, the search input 102 may be, or may be used to generate, searchable elements for music-based searching. In certain embodiments, the searchable elements may be stored in a search database 115 as material for a music-based search. In other embodiments, the searchable elements may be passed to the network 110 for use in a music-based search.

Audio Deconstruction

In some embodiments of the invention, it may be desirable to provide deconstruction of music elements from music input data, like audio signal data and score image data. It will be appreciated that there are many ways of deconstructing music elements from different types of music input data. In some cases, the data may be stored in an audio file in a manner which is simple to deconstruct. For example, music element data may be stored as header information in an enhanced audio file. In other cases, however, certain types of music elements may be non-trivial to extract from the music input data.

Figure 4A:
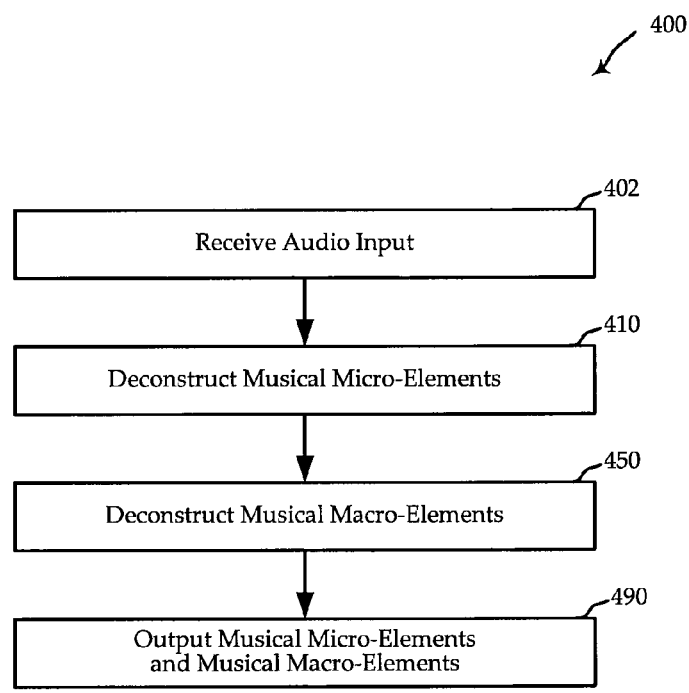
FIG. 4A shows a flow diagram of a method for deconstructing music input data according to the invention.

FIG. 4A shows a flow diagram of a method 400 for deconstructing music input data according to the invention. The method 400 begins by receiving the music input data at block 402. In some embodiments, the music input received at block 402 may include music search input, music or music elements stored in a search database, or other music data compatible with music-based searching.

At block 410, music micro-elements are deconstructed from the music input. By way of example, music micro-elements may include note pitches and values, time stamps, note envelopes and timbres, keys, tempos, and other similar elements. In certain embodiments, music micro-elements may include groups of other music micro-elements (e.g., tied notes, triplets, notes grouped by track or instrument, notes grouped by measure, notes grouped by contributor, etc.). In other embodiments, music micro-elements may include components of other music micro-elements (e.g., stems, flags, dots, etc.).

At block 450, music macro-elements are deconstructed. By way of example, music macro-elements may include information generated from analyzing groups and patterns of music micro-elements. In some embodiments, music macro-elements include local or global pattern information relating to groups of music micro-elements (e.g., rhythm signatures, repeated motifs, chord/key changes, form (e.g., A-B-A, or Chorus-Verse-Verse-Chorus), etc.). In other embodiments, music macro-elements include statistical information derived from sets of music micro-elements (e.g., histograms of note or rhythm patterns, etc.). The music micro-elements and macro-elements may then be output at block 490.

Figure 4B:
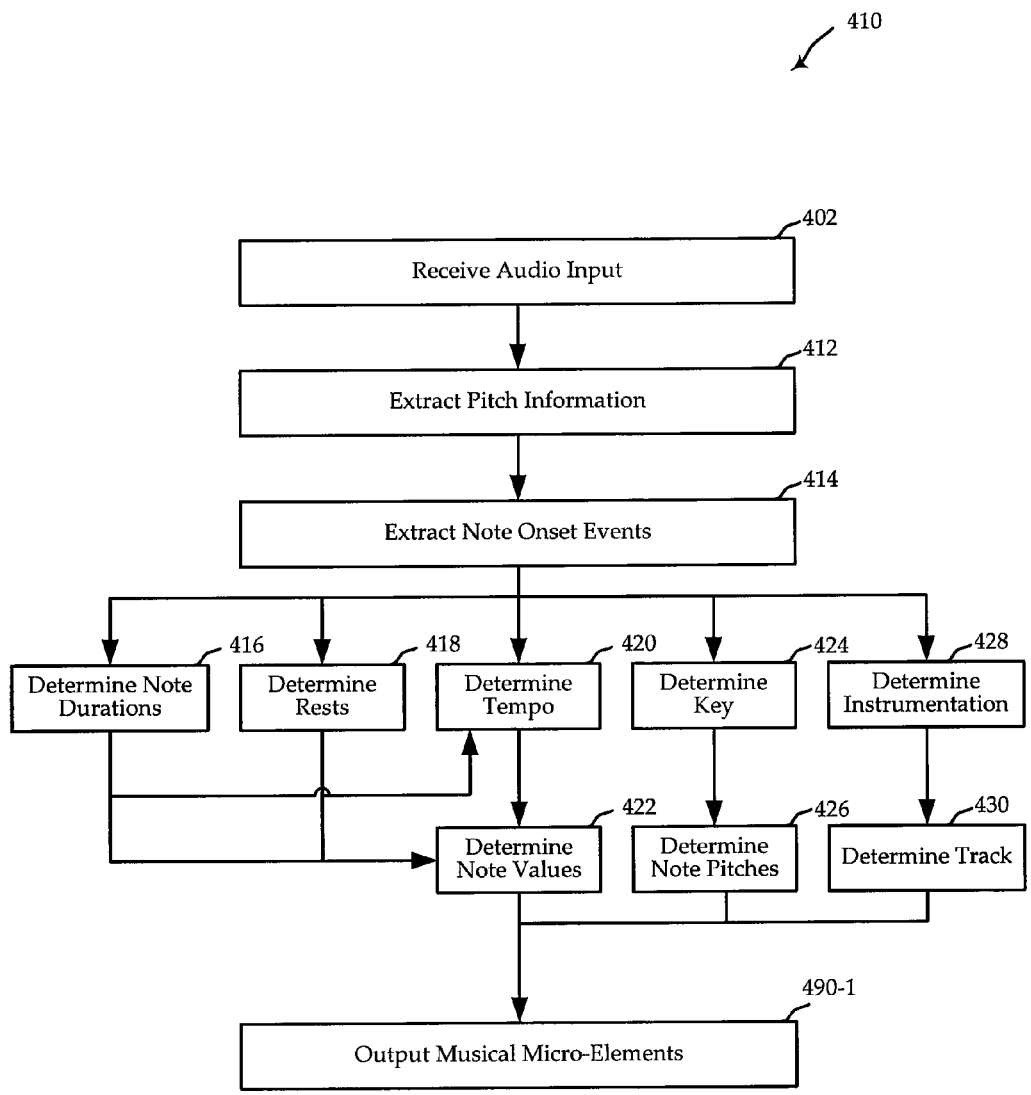
FIG. 4B shows an embodiment of a method for deconstructing music micro-elements according to the invention.

FIG. 4B shows an embodiment of the method 410 for deconstructing music micro-elements according to the invention. The method 410 begins at block 402 by receiving a music input signal. In some embodiments, the music input signal may be preprocessed. For example, the audio signal may be converted from analog to digital, down-converted to a lower sample rate, transcoded for compatibility with certain encoders or decoders, parsed into monophonic audio tracks, or any other useful preprocessing.

In some embodiments, pitch information is extracted in block 412 and note onset events are extracted at block 414. In some embodiments of the method 410, the pitch information extracted in block 412 and the note onset events extracted in block 414 are used to extract and process other information from the audio signal received at block 402.

In certain embodiments, the information is used to determine note durations at block 416, to determine rests at block 418, to determine tempos over time windows at block 420, to determine keys over windows at block 424, and to determine instrumentation at block 428. In other embodiments, the note durations determined at block 416, rests determined at block 418, and tempos determined at block 420 are used to determine note values at block 422; the keys determined at block 424 are used to determine key pitch designations at block 426; and the instrumentation determined at block 428 is used to determine tracks at block 430. In various embodiments, the outputs of blocks 412-430 are configured to be used to generate output as music micro-elements at block 490-1.

Figure 4C:
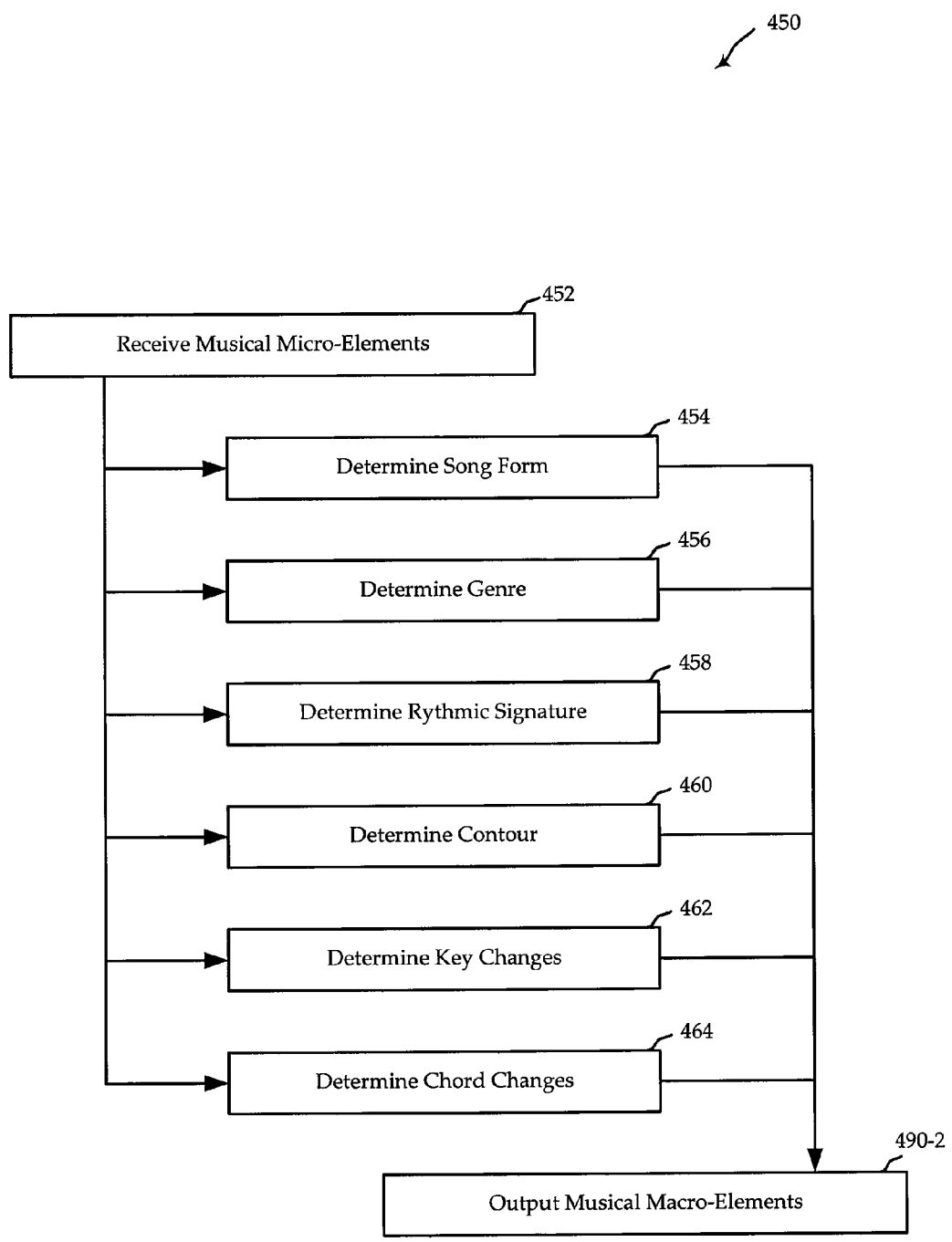
FIG. 4C shows an embodiment of a method for deconstructing music macro-elements according to the invention.

FIG. 4C shows an embodiment of a method 450 for deconstructing music macro-elements according to the invention. The method 450 begins at block 452 by receiving music micro-elements (e.g., from the method 410 of FIG. 4B). The music micro-elements may be used to generate a number of types of music macro-elements.

In some embodiments, the music micro-elements are used to determine song form at block 454 (e.g., Intro-Verse-Chorus-Verse-Bridge-Chorus-Chorus-Outro); to determine genre at block 456 (e.g., rock, classical, jazz, Indian classical, etc.); to determine rhythmic signature at block 458 (e.g., the first movement is in 4/4 meter at a tempo of 90 beats per minute (bpm), the second movement is in 3/4 meter at a tempo of 120 bpm, and the third movement returns to 4/4 time, while remaining at a tempo of 120 bpm); to determine contour at block 460 (e.g., the song begins with only drums and bass at a relatively low volume and fast tempo, and after one minute, the song adds a clean guitar line at a medium volume and a slower tempo); to determine key changes at block 462 (e.g., the song begins in the key of C-major, modulates to F-major, quickly modulates through D-minor and G-major, and returns to C-major); and to determine chord changes at block 464 (e.g., a portion of the song changes from $Am^7$ to $Dm^7$ to $Gm^7$ to $C^7$ to $F^6$, or the song changes from $iii^7$ to $vi^7$ to $ii^7$ to $V^7$ to $I^6$). In various embodiments, the outputs of blocks 454-464 are configured to be used to generate output as music macro-elements at block 490-2.

It will be appreciated that many other types of music micro-elements and music macro-elements are possible according to the invention. Further, depending on the types of music elements needed for searching, a music input signal may be deconstructed at many different levels. For example, a temporary drum track may be used only to provide rhythmic information. In that case, it may be a waste of resources to deconstruct or save music elements relating to pitch, timbre, key, etc. In another example, a vocal line may be used to provide a general guideline for the contour of pitch changes throughout a section of a song. In that case, it may not be important to deconstruct precise pitches, note durations, etc.; rather it may be more efficient to extract only the general direction of pitch movement with approximate pitch values and durations.

Figure 5A:
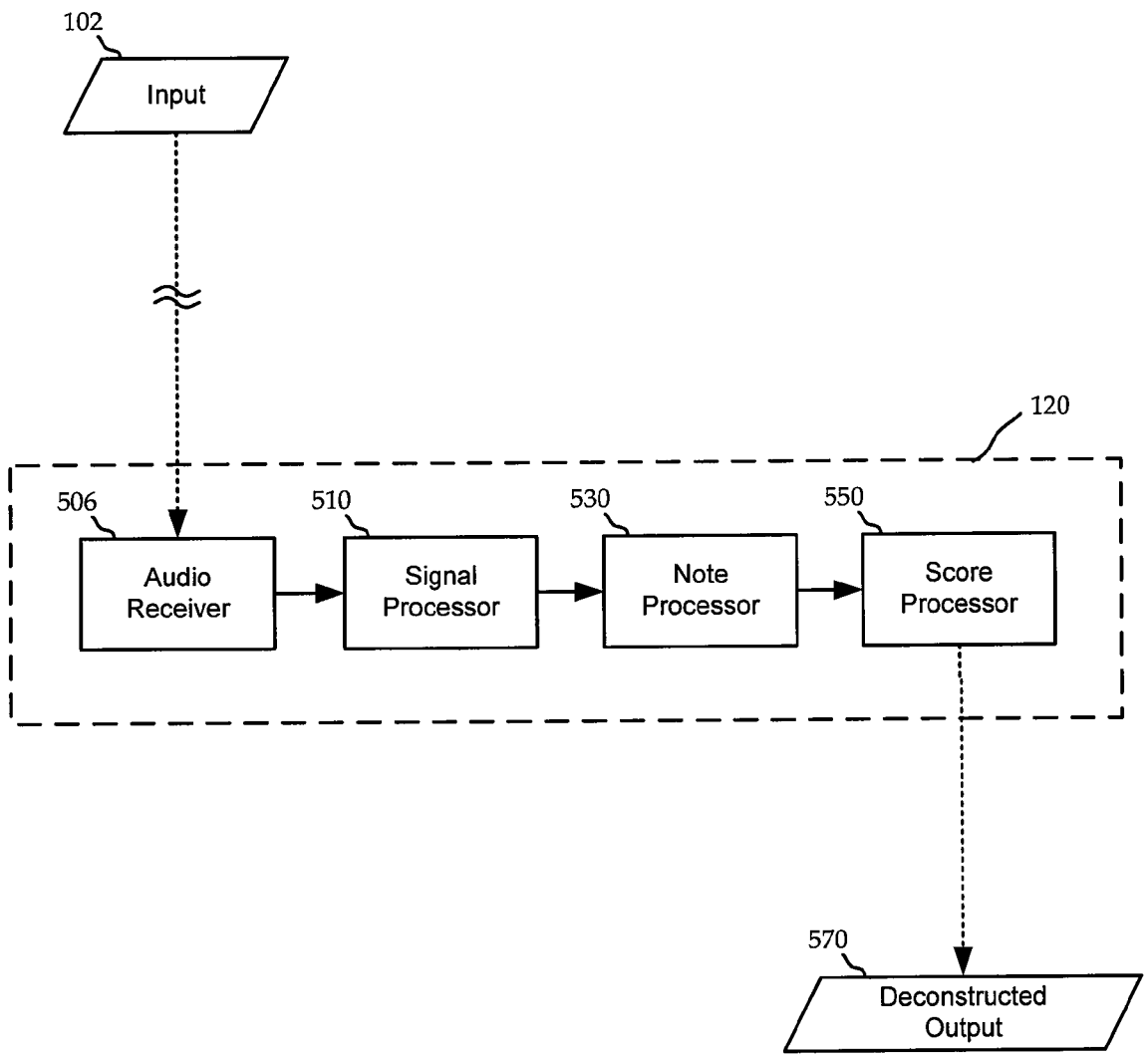
FIG. 5A shows a simplified block diagram of an exemplary system for deconstructing audio signal input to generate music elements according to the invention.

It will be further appreciated that, depending on the type of music data available and various application needs, there may be many ways to deconstruct music elements from the music input. FIG. 5A shows a simplified block diagram of an exemplary system for deconstructing an audio signal input to generate music elements according to embodiments of the invention. As shown, the input 102 is received by a music deconstruction unit 120, which deconstructs the input 102 to generate deconstructed output 570.

In some embodiments, the input 102 is received by the musical deconstruction unit 120 at an audio receiver unit 506. In one embodiment, a composition is received in real time by a microphone or microphone array and transduced to an analog electrical input 102 for receipt by the audio receiver unit 506. In other embodiments, the input 102 may comprise digital data, such as a recorded music file suitable for playback. If the input 102 is an analog signal, it may be converted by the audio receiver unit 506 into a digital representation in preparation for digital signal processing by a signal processor unit 510, a note processor unit 530, and a score processor unit 550. When the input 102 is received in real time, there may be no way to predetermine the full length of the input 102. As such, the input 102 may be received and stored in predetermined intervals (e.g., an amount of elapsed time, number of digital samples, amounts of memory used, etc.), and may be processed accordingly. In another embodiment, a recorded sound clip is received by the audio receiver 506 and digitized, thereby having a fixed time duration.

Figure 5B:
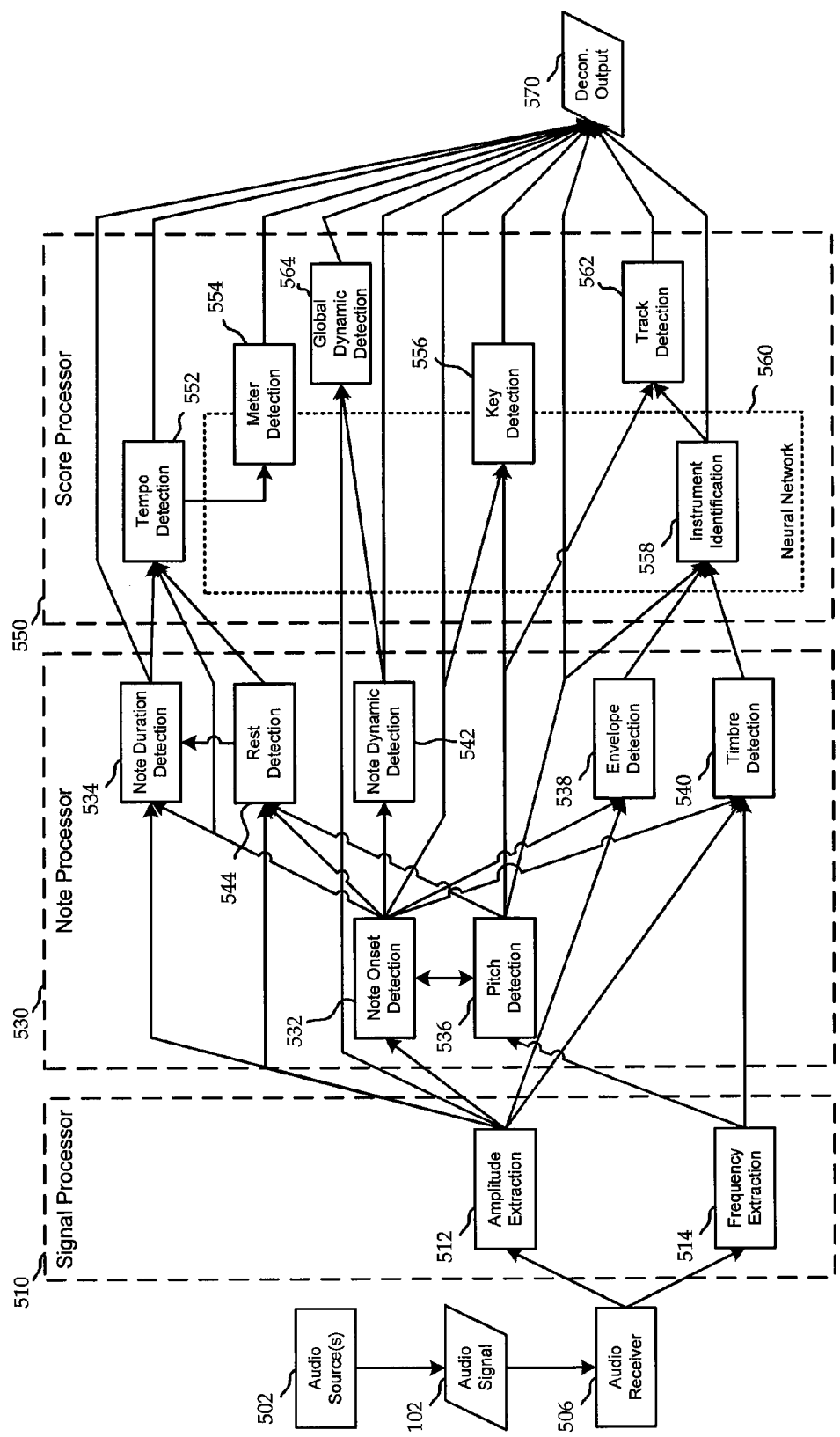
FIG. 5B shows a lower-level block diagram of one embodiment of an audio deconstruction unit according to the invention.

A lower-level block diagram of one embodiment of the music deconstruction unit 120 is provided in FIG. 5B. One or more audio sources 502 may be used to generate a music input signal 102. The audio source 502 may be anything capable of providing a music input signal 102 to the audio receiver 506. In some embodiments, one or more microphones, transducers, and/or other sensors are used as audio sources 502. The microphones may convert pressure or electromagnetic waves from a live performance (or playback of a recorded performance) into an electrical signal for use as a music input signal 102. For example, in a live audio performance, a microphone may be used to sense and convert audio from a singer, while electromagnetic "pick-ups" may be used to sense and convert audio from a guitar and a bass. In other embodiments, audio sources 502 may include analog or digital devices configured to provide a music input signal 102 or an audio file from which a music input signal 102 may be read. For example, digitized audio files may be stored on storage media in an audio format and provided by the storage media as a music input signal 102 to the audio receiver 506.

It will be appreciated that, depending on the audio source 502, the music input signal 102 may have different characteristics. The music input signal 102 may be monophonic or polyphonic, may include multiple tracks of audio data, may include audio from many types of instruments, and may include certain file formatting, etc. Similarly, it will be appreciated that the audio receiver 506 may be anything capable of receiving the music input signal 102. Further, the audio receiver 506 may include one or more ports, decoders, or other components necessary to interface with the audio sources 502, or receive or interpret the music input signal 102.

The audio receiver 506 may provide additional functionality. In one embodiment, the audio receiver 506 converts analog music input signals 102 to digital music input signals 102. In another embodiment, the audio receiver 506 is configured to down-convert the music input signal 102 to a lower sample rate to reduce the computational burden to the system 500. In one embodiment, the music input signal 102 is down-sampled to around 8-9 kHz. This may provide higher frequency resolution of the music input signal 102, and may reduce certain constraints on the design of the system 500 (e.g., filter specifications).

In yet another embodiment, the audio receiver 506 includes a threshold detection component, configured to begin receiving the music input signal 102 (e.g., start recording) on detection of audio levels exceeding certain thresholds. For example, the threshold detection component may analyze the audio over a specified time period to detect whether the amplitude of the music input signal 102 remains above a predetermined threshold for some predetermined amount of time. The threshold detection component may be further configured to stop receiving the music input signal 102 (e.g., stop recording) when the amplitude of the music input signal 102 drops below a predetermined threshold for a predetermined amount of time. In still another embodiment, the threshold detection component may be used to generate a flag for the system 500 representing the condition of the music input signal 102 amplitude exceeding or falling below a threshold for an amount of time, rather than actually beginning or ending receipt of the music input signal 102.

According to FIG. 5B, the audio receiver 506 passes the music input signal 102 to the signal processor unit 510, which includes an amplitude extraction unit 512 and a frequency extraction unit 514. The amplitude extraction unit 512 is configured to extract amplitude-related information from the music input signal 102. The frequency extraction unit 514 is configured to extract frequency-related information from the music input signal 102.

In one embodiment, the frequency extraction unit 514 transforms the signal from the time domain into the frequency domain using a transform algorithm. For example, while in the time domain, the music input signal 102 may be represented as changes in amplitude over time. However, after applying a Fast Fourier Transform (FFT) algorithm, the same music input signal 102 may be represented as a graph of the amplitudes of each of its frequency components, (e.g., the relative strength or contribution of each frequency band in a range of frequencies, like an overtone series, over which the signal will be processed). For processing efficiency, in may be desirable to limit the algorithm to a certain frequency range. For example, the frequency range may only cover the audible spectrum (e.g., approximately 20 Hz to 20 kHz).

In various embodiments, the signal processor unit 510 may extract frequency-related information in other ways. For example, many transform algorithms output a signal in linear frequency "buckets" of fixed width. This may limit the potential frequency resolution or efficacy of the transform, especially given that the audio signal may be inherently logarithmic in nature (rather than linear). Many algorithms are known in the art for extracting frequency-related information from the music input signal 102.

The amplitude-related information extracted by the amplitude extraction unit 512 and the frequency-related information extracted by the frequency extraction unit 514 may then be used by various components of the note processing unit 530. In some embodiments, the note processing unit 530 includes all or some of a note onset detector unit 532, a note duration detector unit 534, a pitch detector unit 536, a rest detector unit 544, an envelope detector unit 538, a timbre detector unit 540, and a note dynamic detector unit 542.

The note onset detector unit 532 is configured to detect the onset of a note. The onset (or beginning) of a note typically manifests in music as a change in pitch (e.g., a slur), a change in amplitude (e.g., an attach portion of an envelope), or some combination of a change in pitch and amplitude. As such, the note onset detector unit 532 may be configured to generate a note onset event whenever there is a certain type of change in frequency (or pitch) and/or amplitude.

Musical notes may also be characterized by their duration (e.g., the amount of time a note lasts in seconds or number of samples). In some embodiments, the note processing unit 530 includes a note duration detector unit 534, configured to detect the duration of a note marked by a note onset event.

It is worth noting that certain characteristics of music are psychoacoustic, rather than being purely physical attributes of a signal. For example, frequency is a physical property of a signal (e.g., representing the number of cycles-per-second traveled by a sinusoidal wave), but pitch is a more complex psychoacoustic phenomenon. One reason is that a note of a single pitch played by an instrument is usually made up of a number of frequencies, each at a different amplitude, known as the timbre. The brain may sense one of those frequencies (e.g., typically the fundamental frequency) as the "pitch," while sensing the other frequencies merely as adding "harmonic color" to the note. In some cases, the pitch of a note experienced by a listener may be a frequency that is mostly or completely absent from the signal.

In some embodiments, the note processing unit 530 includes a pitch detector unit 536, configured to detect the pitch of a note marked by a note onset event. In other embodiments, the pitch detector unit 536 is configured to track the pitch of the music input signal 102, rather than (or in addition to) tracking the pitches of individual notes. It will be appreciated that the pitch detector unit 536 may be used by the note onset detector unit 532 in some cases to determine a change in pitch of the music input signal 102 exceeding a threshold value.

Some embodiments of the note processing unit 530 include a rest detector unit 544 configured to detect the presence of rests within the music input signal 102. One embodiment of the rest detector unit 544 uses amplitude-related information extracted by the amplitude extraction unit 512 and confidence information derived by the pitch detector unit 536. For example, amplitude-related information may reveal that the amplitude of the music input signal 102 is relatively low (e.g., at or near the noise floor) over some window of time. Over the same window of time, the pitch detector unit 536 may determine that there is very low confidence of the presence of any particular pitch. Using this and other information, the rest detector unit 544 detects the presence of a rest, and a time location where the rest likely began.

In some embodiments, the note processing unit 530 includes a timbre detector unit 540. Amplitude-related information extracted by the amplitude extraction unit 512 and frequency-related information extracted by the frequency extraction unit 514 may be used by the timbre detector unit 540 to detect timbre information for a portion of the music input signal 102. The timbre information may reveal the harmonic composition of the portion of the audio signal 102. In some embodiments, the timbre detector unit 540 may detect timbre information relating to a particular note beginning at a note onset event.

In one embodiment of the timbre detector unit 540, the amplitude-related information and frequency-related information are convolved with a Gaussian filter to generate a filtered spectrum. The filtered spectrum may then be used to generate an envelope around a pitch detected by the pitch detector unit 536. This envelope may correspond to the timbre of the note at that pitch.

In some embodiments, the note processing unit 530 includes an envelope detector unit 538. Amplitude-related information extracted by the amplitude extraction unit 512 may be used by the envelope detector unit 538 to detect envelope information for a portion of the music input signal 102. For example, hitting a key on a piano may cause a hammer to strike a set of strings, resulting in an audio signal with a large attack amplitude. This amplitude quickly goes through a decay, until it sustains at a somewhat steady-state amplitude where the strings resonate (of course, the amplitude may slowly lessen over this portion of the envelope as the energy in the strings is used up). Finally, when the piano key is released, a damper lands on the strings, causing the amplitude to quickly drop to zero. This type of envelope is typically referred to as an ADSR (attack, decay, sustain, release) envelope. The envelope detector unit 538 may be configured to detect some or all of the portions of an ADSR envelope, or any other type of useful envelope information.

In various embodiments, the note processing unit 530 also includes a note dynamic detector unit 542. In certain embodiments, the note dynamic detector unit 542 provides similar functionality to the envelope detector unit 538 for specific notes beginning at certain note onset events. In other embodiments, the note dynamic detector unit 542 is configured to detect note envelopes that are either abnormal with respect to a pattern of envelopes being detected by the envelope detector unit 538 or that fit a certain predefined pattern. For example, a staccato note may be characterized by sharp attack and short sustain portions of its ADSR envelope. In another example, an accented note may be characterized by an attack amplitude significantly greater than those of surrounding notes.

It will be appreciated that the note dynamic detector unit 542 and other note processing units may be used to identify multiple other attributes of a note which may be desirable as part of deconstructed output 570. For example, notes may be marked as slurred, as accented, as staccato, as grace notes, etc. Many other note characteristics may be extracted according to the invention.

Information relating to multiple notes or note onset events (including rests) may be used to generate other information. According to the embodiment of FIG. 5B, various components of the note processing unit 530 may be in operative communication with various components of the score processing unit 550. The score processing unit 550 may include all or some of a tempo detection unit 552, a meter detection unit 554, a key detection unit 556, an instrument identification unit 558, a track detection unit 562, and a global dynamic detection unit 564.

In some embodiments, the score processing unit 550 includes a tempo detection unit 552, configured to detect the tempo of the music input signal 102 over a window of time. Typically, the tempo of a piece of music (e.g., the speed at which the music seems to pass psycho-acoustically) may be affected in part by the presence and duration of notes and rests. As such, certain embodiments of the tempo detection unit 552 use information from the note onset detector unit 532, the note duration detector unit 534, and the rest detector unit 544 to determine tempo. Other embodiments of the tempo detection unit 552 further use the determined tempo to assign note values (e.g., quarter note, eighth note, etc.) to notes and rests.

Meter dictates how many beats are in each measure of music, and which note value it considered a single beat. For example, a meter of 4/4 represents that each measure has four beats (the numerator) and that a single beat is represented by a quarter note (the denominator). For this reason, meter may help determine note and bar line locations, and other information which may be needed to provide a useful deconstructed output 570. In some embodiments, the score processing unit 550 includes a meter detection unit 554, configured to detect the meter of the music input signal 102.

In some embodiments, simple meters are inferred from tempo information and note values extracted by the tempo detection unit 552 and from other information (e.g., note dynamic information extracted by the note dynamic detector unit 542). Usually, however, determining meter is a complex task involving complex pattern recognition.

For example, say the following sequence of note values is extracted from the music input signal 102: quarter note, quarter note, eighth note, eighth note, eighth note, eighth note. This simple sequence could be represented as one measure of 4/4, two measures of 2/4, four measures of 1/4, one measure of 8/8, or many other meters. Assuming there was an accent (e.g., an increased attack amplitude) on the first quarter note and the first eighth note, this may make it more likely that the sequence is either two measures of 2/4, two measures of 4/8, or one measure of 4/4. Further, assuming that 4/8 is a very uncommon meter may be enough to eliminate that as a guess. Even further, knowledge that the genre of the music input signal 102 is a folk song may make it more likely that 4/4 is the most likely meter candidate.

The example above illustrates the complexities involved even with a very simple note value sequence. Many note sequences are much more complex, involving many notes of different values, notes which span multiple measures, dotted and grace notes, syncopation, and other difficulties in interpreting meter. For this reason, traditional computing algorithms may have difficulty accurately determining meter. As such, various embodiments of the meter detection unit 554 use an artificial neural network (ANN) 560, trained to detect those complex patterns. The ANN 560 may be trained by providing the ANN 560 with many samples of different meters and cost functions that refine with each sample. In some embodiments, the ANN 560 is trained using a learning paradigm. The learning paradigm may include, for example, supervised learning, unsupervised learning, or reinforcement learning algorithms.

It will be appreciated that many useful types of information may be generated for use as music elements or deconstructed output 570 by using either or both of the tempo and meter information. For example, the information may allow a determination of where to bar notes together (e.g., as sets of eighth notes) rather than designating the notes individually with flags; when to split a note across two measures and tie it together; or when to designate sets of notes as triplets (or higher-order sets), grace notes, trills or mordents, glissandos; etc.

Another set of information which may be useful in generating music elements or deconstructed output 570 relates to the key of a section of the music input signal 102. Key information may include, for example, an identified root pitch and an associated modality. For example, "A minor" represents that the root pitch of the key is "A" and the modality is minor. Each key is characterized by a key signature, which identifies the notes which are "in the key" (e.g., part of the diatonic scale associated with the key) and "outside the key" (e.g., accidentals in the paradigm of the key). "A minor," for example, contains no sharps or flats, while "D major" contains two sharps and no flats.

In some embodiments, the score processing unit 550 includes a key detection unit 556, configured to detect the key of the music input signal 102. Some embodiments of the key detection unit 556 determine key based on comparing pitch sequences to a set of cost functions. The cost functions may, for example, seek to minimize the number of accidentals in a piece of music over a specified window of time. In other embodiments, the key detection unit 556 may use an artificial neural network to make or refine complex key determinations. In yet other embodiments, a sequence of key changes may be evaluated against cost functions to refine key determinations. In still other embodiments, key information derived by the key detection unit 556 may be used to attribute notes (or note onset events) with particular key pitch designations. For example, a "B" in F major may be designated as "B-natural." Of course, key information may be used to generate a key signature or other information for the music score representation. In some embodiments, the key information may be further used to generate chord or other harmonic information. For example, guitar chords may be generated in tablature format, or jazz chords may be provided.

In other embodiments, the score processing unit 550 also includes an instrument identification unit 558, configured to identify an instrument being played on the music input signal 102. Often, an instrument is said to have a particular timbre. However, there may be differences in timbre on a single instrument depending on the note being played or the way the note is being played. For example, the timbre of every violin differs based, for example, on the materials used in its construction, the touch of the performer, the note being played (e.g., a note played on an open string has a different timbre from the same note played on a fingered string, and a note low in the violin's register has a different timbre from a note in the upper register), whether the note is bowed or plucked, etc.

Still, however, there may be enough similarity between violin notes to identify them as violins, as opposed to another instrument.

Embodiments of the instrument identification unit 558 are configured to compare characteristics of single or multiple notes to determine the range of pitches apparently being played by an instrument of the music input signal 102, the timbre being produced by the instrument at each of those pitches, and/or the amplitude envelope of notes being played on the instrument. In one embodiment, timbre differences are used to detect different instruments by comparing typical timbre signatures of instrument samples to detected timbres from the music input signal 102. For example, even when playing the same note at the same volume for the same duration, a saxophone and a piano may sound very different because of their different timbres. Of course, as mentioned above, identifications based on timbre alone may be of limited accuracy.

In another embodiment, pitch ranges are used to detect different instruments. For example, a cello may typically play notes ranging from about two octaves below middle C to about one octave above middle C. A violin, however, may typically play notes ranging from just below middle C to about four octaves above middle C. Thus, even though a violin and cello may have similar timbres (they are both bowed string instruments), their pitch ranges may be different enough to be used for identification. Of course, errors may be likely, given that the ranges do overlap to some degree. Further, other instruments (e.g., the piano) have larger ranges, which may overlap with many instruments.

In still another embodiment, envelope detection is used to identify different instruments. For example, a note played on a hammered instrument (e.g., a piano) may sound different from the same note being played on a woodwind (e.g., a flute), reed (e.g., oboe), brass (e.g., trumpet), or string (e.g., violin) instrument. Each instrument, however, may be capable of producing many different types of envelope, depending on how a note is played. For example, a violin may be plucked or bowed, or a note may be played legato or staccato.

At least because of the difficulties mentioned above, accurate instrument identification may require detection of complex patterns, involving multiple characteristics of the music input signal 102 possibly over multiple notes. As such, some embodiments of the instrument identification unit 558 utilize an artificial neural network 560 trained to detect combinations of these complex patterns.

Some embodiments of the score processing unit 550 include a track detection unit 562, configured to identify an audio track from within the music input signal 102. In some cases, the music input signal 102 may be in a format which is already separated by track. For example, audio on some Digital Audio Tapes (DATs) may be stored as eight separate digital audio tracks. In these cases, the track detection unit 562 may be configured to simply identify the individual audio tracks.

In other cases, however, multiple tracks may be stored in a single music input signal 102 and need to be identified by extracting certain data from the music input signal. As such, some embodiments of the track detection unit 562 are configured to use information extracted from the music input file 102 to identify separate audio tracks. For example, a performance may include five instruments playing simultaneously (e.g., a jazz quintet). It may be desirable to identify those separate instruments as separate tracks.

Track detection may be accomplished in a number of different ways. In one embodiment, the track detection unit 562 uses pitch detection to determine whether different note sequences appear restricted to certain pitch ranges. In another embodiment, the track detection unit 562 uses instrument identification information from the instrument identification unit 558 to determine different tracks.

Many scores also contain information relating to global dynamics of a composition or performance. Global dynamics refer to dynamics which span more than one note, as opposed to the note dynamics described above. For example, an entire piece or section of a piece may be marked as forte (loud) or piano (soft). In another example, a sequence of notes may gradually swell in a crescendo. To generate this type of information, some embodiments of the score processing unit 550 include a global dynamic detection unit 564. Embodiments of the global dynamic detection unit 564 use amplitude information, in some cases including note dynamic information and/or envelope information, to detect global dynamics.

In certain embodiments, threshold values are predetermined or adaptively generated from the music input signal 102 to aid in dynamics determinations. For example, the average volume of a rock performance may be considered forte. Amplitudes that exceed that average by some amount (e.g., by a threshold, a standard deviation, etc.) may be considered fortissimo, while amplitudes that drop below that average by some amount may be considered piano. Certain embodiments may further consider the duration over which dynamic changes occur. For example, a piece that starts with two minutes of quiet notes and suddenly switches to a two-minute section of louder notes may be considered as having a piano section followed by a forte section. On the other hand, a quiet piece that swells over the course of a few notes, remains at that higher volume for a few more notes, and then returns to the original amplitude may be considered as having a crescendo followed by a decrescendo.

All the various types of information described above, and any other useful information, may be generated for use as music elements or deconstructed output 570. In addition to the music elements or deconstructed output 570 described with reference to the various components of the system, any number of other music elements or deconstructed output 570 may be generated from the same or other information. In one example, say a note is determined to be a staccato dotted eighth note. Other music 570 elements may include the note body, stem, flag, duration dot, staccato dot, and other characteristics of the note. Even other music elements 570 may include the style and color of the note representation on a display or print-out, the direction of the stem (e.g., the direction may be defaulted or dictated based on its location on the staff, or it may be changed to designate that the note is part of a specific note sequence), the size of the note body (e.g., it may be sized for readability, to distinguish it from other notes, or for some other reason), the shape of the note head (e.g., it may be a different shape for a percussive sound), or any other useful information. In other examples, the music elements or deconstructed output 570 may include staff lines, clefs, measure numbers, lyrics, lyrical alignments, page titles, staff titles, page margins, instrumentation data, playback data, etc. In still other examples, music elements or deconstructed output 570 may include other information useful for enhancing the efficacy of a music-based search. The music elements or deconstructed output 570 may be saved or output.

It will be appreciated that the various units and components described above may be implemented in various ways without departing from the invention. For example, certain units may be components of other units, or may be implemented as additional functionality of another unit. Further, the units may be connected in many ways, and data may flow between them in many ways according to the invention. Even further, various embodiments relating to audio deconstruction are described further in U.S. application Ser. No. 12/024,981 entitled "MUSIC TRANSCRIPTION" to Robert D. Taub, et al. filed Feb. 1, 2008, which is incorporated herein by reference for all purposes.

Score Deconstruction

In addition to, or instead of, deconstructing music elements from audio signals, it may be desirable in some cases to deconstruct music elements from score images. Embodiments of the invention are configured to accept score images as input. It will be appreciated that many ways are possible to deconstruct music elements from a score image, or perform score deconstruction.

Figure 6A:
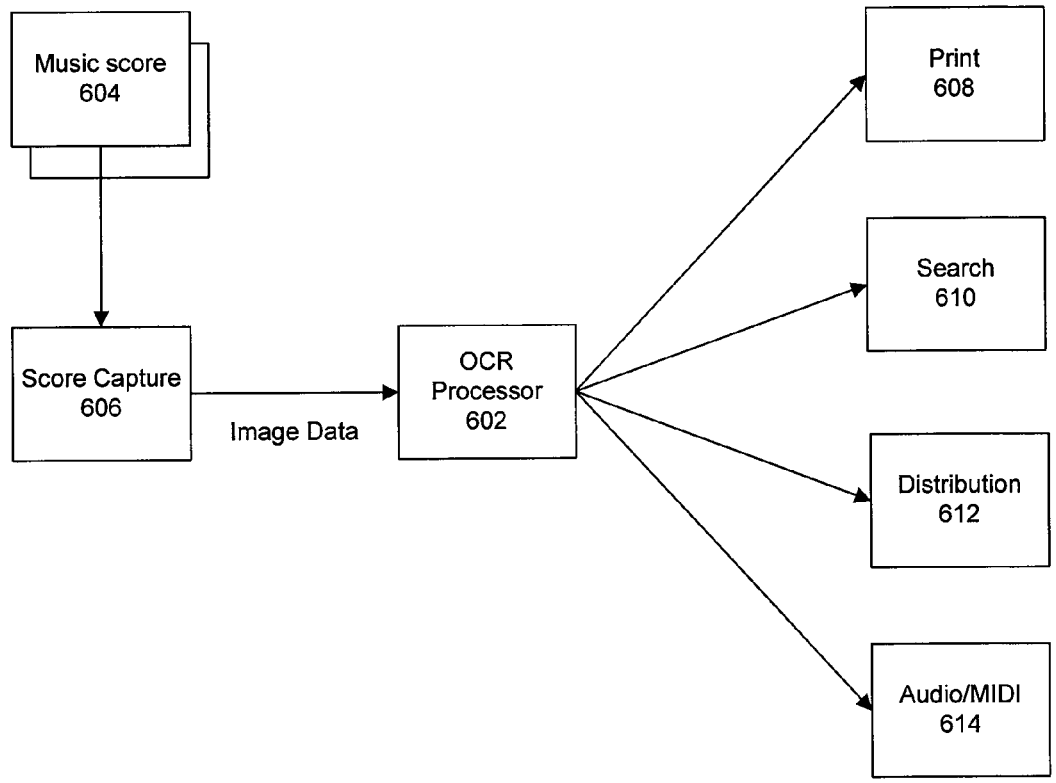
FIG. 6A shows an exemplary system that processes music image data in accordance with the present invention to provide an optical character recognition (OCR) feature.

FIG. 6A shows a system that processes music image data in accordance with the present invention to provide an optical character recognition (OCR) feature. An OCR processor 602 receives image data of a music score 604 that is captured with a score capture device 606, such as a camera or scanner. The OCR processor 602 produces music score output comprising data that corresponds to the music score input, albeit in a digital form that can be put to a variety of uses. The digital representation of the music score can be easily processed by other systems, including but not limited to, printed output, for use by a search mechanism, for distribution and collaboration with multiple users, and for generating audio output such as with MIDI components. For example, FIG. 6A shows that the music score output can be provided to a print function 608, a search function 610, a distribution function 612, and for audio/MIDI output 614.

The captured music score images can be produced with any image capture device, including a webcam, a phone camera, a point-and-shoot camera, as well as other and more sophisticated cameras. Once the image of the music score is captured, it is presented to the OCR processor for adjustments and additional processing.

Figure 6B:
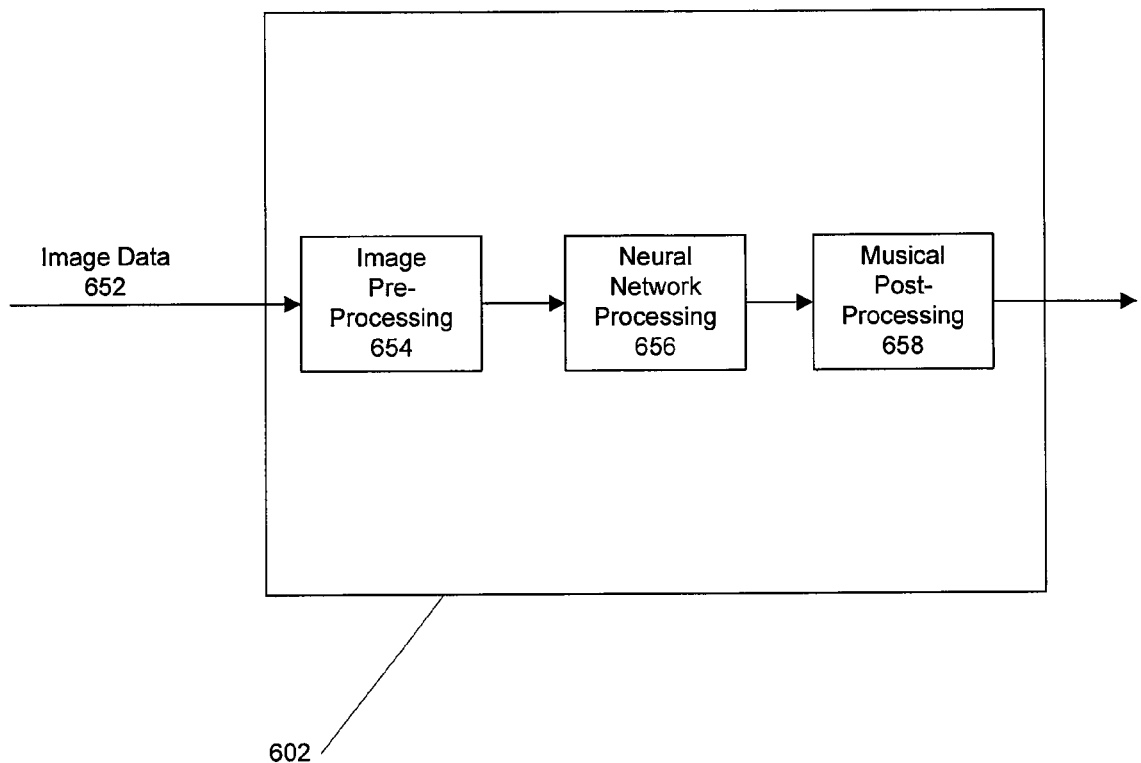
FIG. 6B shows exemplary image data, produced from the capture device shown in FIG. 6A, provided as input to the OCR processor.

FIG. 6B shows the image data 652, produced from the capture device 606 (FIG. 6A), provided as input to the OCR processor 602. FIG. 6B shows that the OCR processor 602 includes an image pre-processing component 654 that receives the image data. The image data may be in the form of, for example, a bitmap image (.bmp), JPEG data, TIFF data, and other file formats commonly used by digital cameras, and the like. The image pre-processing component performs binarization, skew-correction of the image, and removal of irrelevant background components. The binarization operation relates to adjustments for brightness and contrast in the captured image. The skew correction operation relates to correction of images that are rotated from an orientation that aligns music staff lines to be parallel to the bottom edge of the image. The irrelevant background component removal cleans up the image by removing noise artifacts and otherwise unwanted background components. If desired, the preprocessing operations can be performed by external image processing routines or modules.

The pre-processing component 654 provides the resulting data to the neural network (NN) processing component 656. The NN processing component 656 identifies music symbology in the captured image, and performs cognitive processing of the optical image. That is, the neural network performs a computer process that recognizes the music symbols in the captured music image and, where necessary, cognitively interprets the identified symbols and extrapolates from the input data to determine appropriate labels for the artifacts or symbology in the captured image.

The NN processing component 656 comprises a trained neural network that receives the adjusted music score image. If desired, the trained neural network can utilize its output to provide feedback and adjust its operation. Such feedback may entail factor graph operations to utilize back propagation techniques, or to adjust network node weights of the already-trained neural network. Other techniques for using output as feedback will be known to those skilled in the art.

The output of the NN processing component 656 is provided to a post-processing component 658, which produces the output of the NN. The output of the post-processing component can then be provided to various functions, such as the print, search, distribution, and audio functions illustrated in FIG. 6A. The post-processing component performs an interpreting function on the NN output to determine which artifact types identified by the NN are likely correct. The interpretation by the post-processing component 658 is based on confidence values produced by the NN. Those skilled in the art will be familiar with interpretation techniques for NN confidence value output data. The post-processing then produces the OCR processor output in a suitable format, such as musical note information or other information corresponding to the identified musical artifacts. For example, the music information may take the form of an electronic instrument representation, such as the MIDI format, or other data format, or other combination of information.

It will be appreciated that the various units and components described above may be implemented in various ways without departing from the invention. For example, certain units may be components of other units, or may be implemented as additional functionality of another unit. Further, the units may be connected in many ways, and data may flow between them in many ways according to the invention. Even further, various embodiments relating to score decomposition are described further in U.S. Provisional Application No. 61/028,490, entitled "MUSIC SCORE DECONSTRUCTION" to Robert D. Taub, et al. filed Feb. 13, 2008, which is incorporated herein by reference for all purposes. Other aspects of music score capture techniques may be found in U.S. patent application Ser. No. 11/303,812 entitled "SYSTEM AND METHOD FOR MUSIC SCORE CAPTURE AND SYNCHRONIZED AUDIO PERFORMANCE WITH SYNCHRONIZED PRESENTATION" to Robert D. Taub filed Dec. 15, 2005, which is incorporated herein by reference for all purposes.

Search Engine

Many aspects of the invention relate to the functionality and/or construction of the search engine. In some embodiments, the search engine may be implemented as the search engine 160 of FIG. 1. Various embodiments of the collaboration portal may provide functionality relating to search input and output handling, search execution, and results processing, as well as file management, music viewing, music and text editing, and other facets of music-based searching. It will be appreciated that many possibilities are available regarding graphical user interface ("GUI") design and implementation, levels of user interaction allowed by the collaboration portal, types of GUI controls, functional crossover and dependence between modules and components, network design and interface, and other aspects of the search engine. As such, the description below is intended to describe only some exemplary embodiments of the invention, and those of skill in the art will appreciate that the scope of the invention is not limited by the specific embodiments disclosed.

Figure 7:
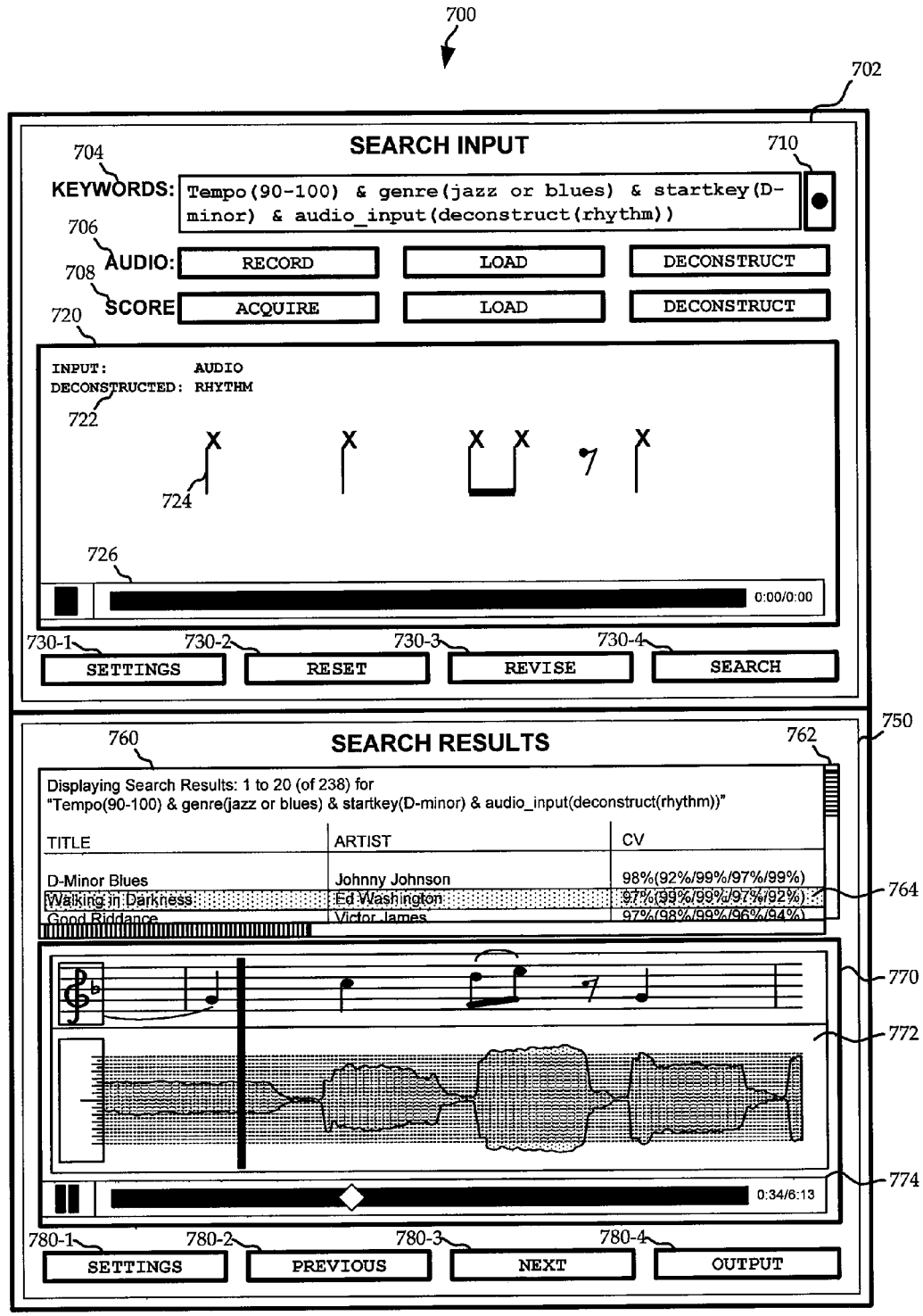
FIG. 7 shows an embodiment of a GUI for a music-based search engine according to the invention.

FIG. 7 shows one exemplary configuration of a graphical user interface ("GUI") for use with embodiments of a music based search engine according to the invention. The GUI 700 includes at least two primary sections (illustrated in FIG. 7 as frames): a search input section 702 and a search results section 750. The search input section 702 handles, among other things, receiving and processing search inputs of various types and using them to generate search parameters. The search results section 750 handles, among other things, receiving search results, displaying search results, and generating search output.

The search input section 702 includes a number of GUI elements relating to input receipt, input display, and input section control. A number of types of input receipt are possible according to the invention, including keyword input 704, audio input 706, and score input 708 (as illustrated in FIG. 7). The keyword input, audio input, and score input may be received as part of the same query, or may be received successively in an iterative fashion, or in any sequence. Keyword input 704 includes receipt of any type of alphanumeric, textual or text-related input. In one embodiment, the keyword input 704 includes plain language text, which is interpreted to generate a set of keywords. In another embodiment, the keyword input 704 includes specialized text operable to be converted to keywords. For example, the specialized text may include field entry, Boolean operators, etc. The text may then be processed in any useful way (e.g., by using document type definitions in a markup language, like XML).

In yet another embodiment, the keyword input 704 is received using audio signal processing. For example, a user may click a record button 710, which begins speech recording. The speech recording may then be processed by a speech-to-text processor. The processed text may then be further processed into keywords in any useful way for query input, including the ways discussed above.

In one embodiment, the received keyword input 704 is "TEMPO('90-100') & GENRE('jazz or blues') & START-KEY('D-minor') & AUDIO_INPUT(DECONSTRUCT ('rhythm'))". It will be appreciated that this received keyword input 704 is intended to be illustrative only, and input could include many other contents and types of keyword inputs. This exemplary keyword input 704 may represent that the searcher desires to find songs with a tempo between 90 and 100 bpm, a genre of either jazz or blues, a starting key of D-minor, and a rhythm similar to the one deconstructed from received audio input. It is worth noting that "&" denotes a Boolean "and" operation. It is further worth noting that many ways are known in the art for receiving and processing keyword input, many of which allow a user to enter keywords without learning specialized semantics.

The audio input 706 may be received and processed in a number of different ways. To accommodate the various possible receipt and processing functions, a set of GUI controls may be provided. For example, as shown, buttons may be provided for receiving an audio input signal (e.g., from a microphone or other audio input source), loading an audio input file, or deconstructing a received audio signal or file into music elements. The audio input may include more than one type of input. For example, a melodic portion might comprise a tune that is hummed or sung and a spoken word portion may comprise spoken words. A portion separator may be provided in the audio input between the types for automatic detection of the portions and may comprise, for example, a predetermined word.

The score input 708 may similarly be received and processed in a number of different ways. To accommodate the various possible receipt and processing functions, a set of GUI controls may be provided. For example, as shown, buttons may be provided for receiving a score image (e.g., from a camera, scanner, or other digital imaging device), loading a score image file, or decomposing a received score image into music elements.

In some embodiments, an input display frame 720 is provided for displaying information relating to received and/or processed input. Certain embodiments of the input display frame 720 include audio and/or score deconstruction result information 722, raw and/or deconstructed musical element representation display 724, and playback/visualization/record controls 726.

In one embodiment, audio input 706 is received by recording a rhythm clapped or hummed into a microphone by a searcher. The audio input 706 is then decomposed to extract musical elements relating to rhythm (e.g., note onsets and durations, rests, tempo, etc.). Information is provided in the audio and/or score deconstruction result information 722 area, stating that rhythm has been successfully deconstructed from the audio input signal. In the raw and/or deconstructed musical element representation display 724 area, an illustration of the deconstructed musical elements is displayed for the searcher. The types of musical elements produced by the audio and/or score deconstruction are described above. The searcher may use the information in the audio and/or score deconstruction result information 722 area and the raw and/or deconstructed musical element representation display 724 area to determine whether the search engine 700 recorded and decomposed as desired by the user.

The playback/visualization/record controls 726 may include any useful controls for handling playback, visualization, recording, or other aspects which may impact the input display frame 720. For example, the playback/visualization/record controls 726 may include playback/record buttons (e.g., record, play, pause, stop, fast-forward, insert, record over, crop, etc.), playback/record buttons progress indicators (e.g., memory indicators, elapsed time indicators, position indicators, etc.), visualization controls (e.g., zoom and pan controls, mode switching controls (e.g., score representation mode, audio signal/envelope representation mode, piano-roll representation mode, etc.), etc.), and/or any other useful controls.

Embodiments of the search input section 702 include input section controls. It will be appreciated that many types of controls (e.g., sliders, knobs, switches, buttons, etc.) may be provided to control many functions of the search input section 702. In some embodiments, the input section controls include a set of input control buttons 730, such as a settings button 730-1, a reset button 730-2, a revise button 730-3, and a search button 730-4.

The settings button 730-1 may control any number of settings of the search input section 702. In some embodiments, clicking the settings button causes a settings menu to appear, providing access to any number of settings. Some settings may relate to receiving the search inputs, including file management (e.g., configuring the search engine 700 to accept certain file types or to receive audio or video from certain ports or components), linguistics (e.g., configuring the search engine 700 to accept text in certain semantic formats), etc. Other settings may relate to processing the received inputs, including configuring weightings (e.g., configuring the search engine 700 to weigh the different search inputs in different ways, etc.), audio and score deconstruction (e.g., setting minimum quantization values (e.g., note durations, pitch variations, etc.), configuring the search engine 700 to detect only certain types or sets of music elements, etc.), etc.

For example, in the illustrative embodiment shown in FIG. 7, the settings may configure the search engine 700 in a number of ways. The search engine 700 may be configured to accept audio input through a sound card in a workstation, to look only for rhythmic music elements, to look only for audio above a certain threshold volume (or attack level), and to quantize all note and rest values to the nearest eighth note. The search engine 700 may be further configured to weigh the deconstructed rhythm higher than the text input (e.g., such that the deconstructed rhythm will be treated as a more important search term), and to weigh the tempo keyword input as the second-most important search term.

The reset button 730-2 may be configured to reset the search parameters (e.g., to return to a default configuration, to clear the keywords field, to clear weightings, etc.). The revise button 730-3 may be configured to revise a search after results are returned. For example, it may be desirable to search within the results for more specific results, to filter results based on other search input, to change all or a portion of the search inputs, the revise weightings, etc. In this way, a user can input search criteria successively or iteratively as the field of search results becomes increasingly specific or narrow. The search button 730-4 may be configured to generate search parameters based on the search inputs, and use the search parameters to execute the search against one or more databases.

Once the search inputs have been received and processed into keywords, weights, etc., they may be used to generate a set of search parameters. For example, the may be translated into a SQL query for searching through a flat-file database. The set of search parameters may be formatted or generated in any useful way, possibly depending on the type of database being searched and/or the type of data stored in the database.

In some embodiments, the databases store raw audio and/or score files (or pointers to raw audio files), which may be deconstructed "on the fly" (e.g., at or near the time of the search). In other embodiments, the databases store metadata relating to audio files (e.g., which has been deconstructed from audio files, extracted from metadata in audio files, manually entered, generated by some other system, etc.). In still other embodiments, the databases store multiple types of files which may be used in multiple ways for music-based search.

In various embodiments, data is pre-filtered or otherwise pre-processed in its stored condition on a database. In one embodiment, certain predetermined types of music elements may be determined to be likely search candidates and may be pre-deconstructed. For example, say searchers tend to search for songs at particular tempos. The tempos may be pre-deconstructed from files as a sort of pre-sorting or pre-filtering process. In certain embodiments, pre-deconstruction may be performed at a different level (e.g., resolution) than a final deconstruction. For example, to search for songs with a certain melody line, it may be possible first to do a rough deconstruction of pitch contours in songs to narrow down the list of possible match candidates. A more thorough deconstruction may then be performed on only that narrow list of candidates to more accurately determine a match. In other embodiments, metadata or other information relating to files (e.g., genre, author, instrument lists, etc.) may be used to pre-filter or pre-sort data. For example, all songs of a particular genre may be pre-sorted, or songs may be presorted as "fast" or "slow." In these and other ways, multi-tiered pre-processing may be used to preserve system resources, speed up search times, improve results, and for other reasons.

Once search results are retrieved, they may be treated in a number of different ways according to the invention. In some embodiments, search results are ranked. It will be appreciated that there may be many types of and processes for ranking results. Some rankings relate to how closely particular candidates match the search inputs. Other rankings further consider various weightings and other preferences provided by the searcher. Still other rankings consider one or more confidence values (e.g., error values resulting from various cost functions). One type of confidence value may relate to deconstruction of music elements, representing the likelihood that the deconstruction yielded the correct result (e.g., tempo may be determined as 90 bpm with 96% confidence due to various reasons, including outliers or slight, expressive variations). Of course the deconstruction may relate to deconstruction of search inputs and/or deconstruction of retrieved data (e.g., data stored in a database). Another type of confidence value may relate to search confidence. For example, a melody line used as search input may match a melody line retrieved from a database with 99% confidence (e.g., a small number of notes in the retrieved melody fail to precisely match the input melody).

Results (e.g., ranked results) may then be displayed in the search results section 750 of the GUI 700. The search results section 750 includes a number of GUI elements relating to results display and results section control. While many types of results display are possible, FIG. 7 illustrates a result list display area 760 and a result details display area 770.

The result list display area 760 is configured to display the list of results retrieved from one or more databases. In some embodiments, the result list display area includes window controls. For example, the result list display area may include scroll bars 762 on the bottom and side to allow the searcher to more easily scroll through the results.

As illustrated, the result list display area may include information relating to the overall search results, like "Displaying Search Results: 1 to 20 (of 238) for 'TEMPO(90-100) & GENRE(jazz or blues) & STARTKEY(D-minor) & AUDIO_INPUT(DECONSTRUCT(rhythm))'." This type of information may indicate to the searcher that the current list is displaying the first twenty results out of a total 238 results retrieved from databases in response to the illustrative search inputs provided in the search input section 702. The result list area may also include a display of a ranked list (e.g., as a chart). The chart may include high-level information about the results, including, for example, song title, artist, confidence values, etc.

In the illustrated example, the second retrieved result 764 is a song, entitled "Walking in Darkness," by Ed Washington. It is worth noting that the illustrated results consist of fabricated data, and are not intended to refer in any way to real music compositions or artists. The confidence values are displayed as "97% (99%/99%/97%/92%)." This may represent that the search returned a 99% confidence regarding tempo, a 99% confidence regarding genre, a 97% confidence regarding the starting key, and a 92% confidence regarding the rhythm decomposed from the audio search input, for a weighted total confidence value of 97%. It may be desirable in some cases to present the searcher with some or all the confidence values incorporated into the search for various reasons. For example, the searcher may wish to know that, while one result may have a relatively high confidence value in total, one parameter significantly departed from the search inputs. This may allow the searcher to more effectively revise future searches to retrieve more tailored results.

The result details display area 770 may be configured to determine any number of different types of data relating to the details of a particular result. In one embodiment, various representations of the audio associated with a selected result are displayed. For example, a score representation, audio signal representation, piano roll representation, or any other useful representation may be displayed. In another embodiment, the same or other text information may be provided as what is provided in the result list display area 760 (e.g., using larger font, providing more details, providing cover art images from the album cover for the song, providing hyperlinks to purchase the song or visit the band's website, etc.). In some embodiments, the result details display area 770 includes playback/visualization/record controls 774 (e.g., similar to the playback/visualization/record controls 726 provided in embodiments of the input display frame 720).

Embodiments of the search results section 750 include results section controls. It will be appreciated that many types of controls (e.g., sliders, knobs, switches, buttons, etc.) may be provided to control many functions of the search results section 750. In some embodiments, the results section controls include a set of results control buttons 780, such as a settings button 780-1, a previous button 780-2, a next button 780-3, and an output button 780-4.

The settings button 780-1 may control any number of settings of the search results section 702. In some embodiments, clicking the settings button causes a settings menu to appear, providing access to any number of settings. Some settings may relate to how results are received (e.g., a maximum number of results, types of rankings, etc.), how results are displayed (e.g., what columns are displayed in the result list display area 760, which representations or what text is shown in the result details display area 770, etc.), etc.

The previous button 780-2 and the next button 780-3 may be configured to jump to the previous or next result in the results list, respectively. Of course other navigation controls may be possible (e.g., next page, sort, filter, etc.). The output button 780-4 may be configured to output the search result data in one or more ways. In some embodiments, the output may be generated by the output generation unit 140 of FIG. 1. It will be appreciated that many types of output of many different types of data are possible. For example, the results data may be output as raw audio data (e.g., a signal configured to be played through speakers, media playing devices, sound cards, etc.), encoded audio data (e.g., for storage on storage media (e.g., a compact disk), for playback through media-playing software, for sharing over a network, etc.), score representation data (e.g., a score image, music elements compatible with score creation and/or editing software, etc.), text data (e.g., text relating to the results list or results details for storage as a file, printout, etc.), or any other useful information. Further, output may include logs or records of search inputs, search histories, search statistics, database statistics, settings, etc.

In some embodiments, the search engine 700 is integrated into a collaborative environment (e.g., over the Internet). The search engine may then be used in many ways to exploit the collaborative environment, or vise versa. For example, search inputs and/or results may be shared with others on the network. In one embodiment, users may search for others with similar search patterns, or users may suggest certain search results based on their experiences. For example, after executing a search for "X", the search engine 700 may report that "users who searched for 'X' may also be interested in 'Y'". This and similar types of results may be generated by other users, intelligent algorithms that determine searching habits and patterns, advertisers, or any other device, person, or entity.

Exemplary Implementations

The systems and methods described above may be implemented in a number of ways. One such implementation includes various electronic components. For example, units of the various systems may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 8:
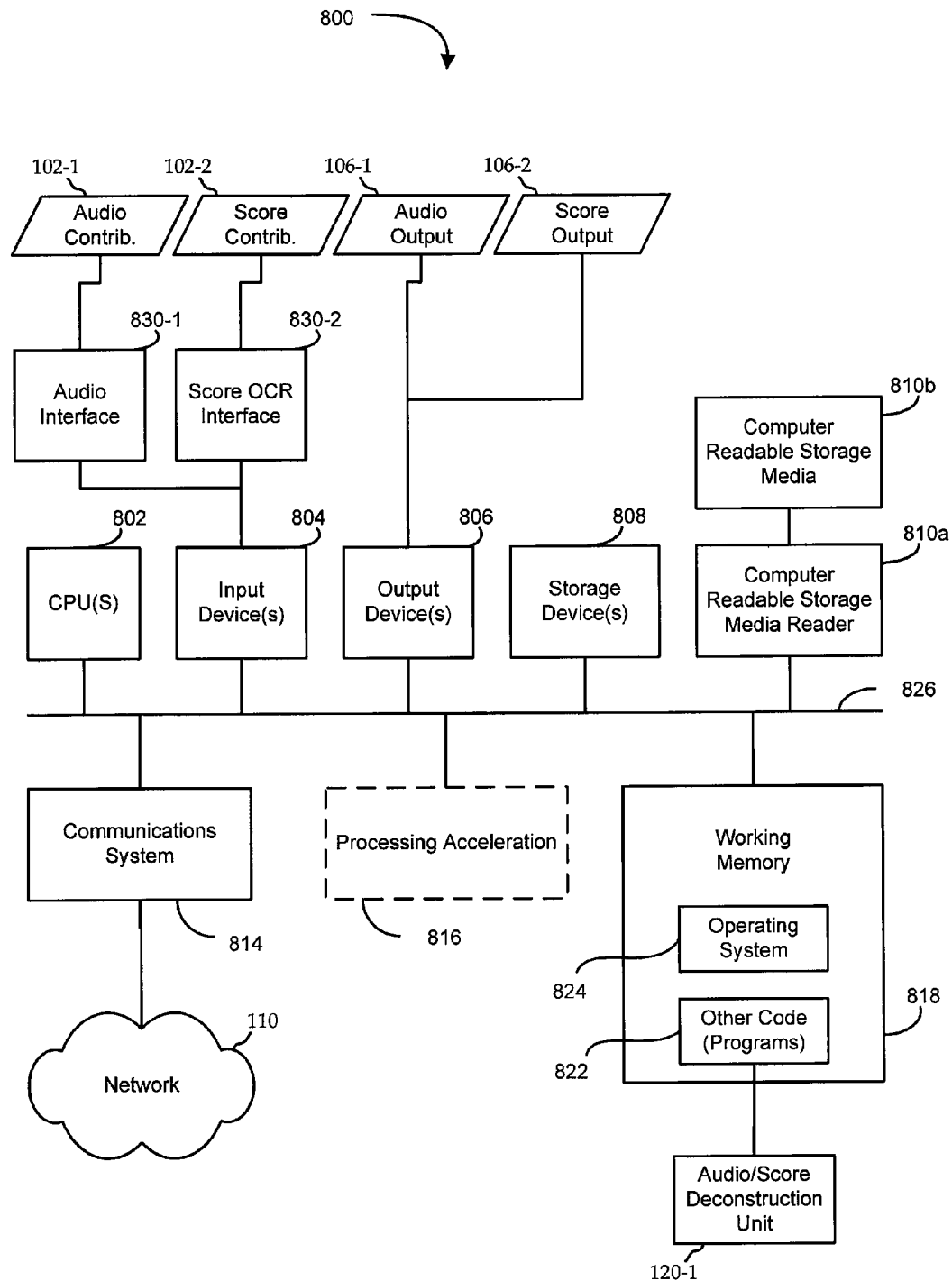
FIG. 8 provides a block diagram of a computational system for implementing certain embodiments of the invention.

FIG. 8 provides a block diagram of a computational system 800 for implementing certain embodiments of the invention. In one embodiment, the computation system 800 may function as the portal 160 shown in FIG. 1. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computational system 800 is shown comprising hardware elements that can be electrically coupled via a bus 826 (or may otherwise be in communication, as appropriate). The hardware elements can include one or more processors 802, including without limitation one or more general-purpose processors and/or one or more special-purpose processors (such as digital signal processing chips, graphics acceleration chips, and/or the like); one or more input devices 804, which can include, without limitation, a mouse, a keyboard, and/or the like; and one or more output devices 806, which can include without limitation a display device, a printer, and/or the like.

The computational system 800 may further include (and/or be in communication with) one or more storage devices 808, which can comprise, without limitation, local and/or network accessible storage and/or can include, without limitation, a disk drive, a drive array, an optical storage device, solid-state storage device such as a random access memory ("RAM"), and/or a read-only memory ("ROM"), which can be programmable, flash-updateable, and/or the like. The computational system 800 might also include a communications subsystem 814, which can include without limitation a modem, a network card (wireless or wired), an infra-red communication device, a wireless communication device and/or chipset (such as a Bluetooth device, an 802.11 device, a WiFi device, a WiMax device, cellular communication facilities, etc.), and/or the like. The communications subsystem 814 may permit data to be exchanged with a network (such as the network described below, to name one example), and/or any other devices described herein. In many embodiments, the computational system 800 will further comprise a working memory 818, which can include a RAM or ROM device, as described above.

The computational system 800 also may comprise software elements, shown as being currently located within the working memory 818, including an operating system 824 and/or other code, such as one or more application programs 822, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). In one embodiment, the audio and/or score deconstruction units 120 of FIG. 1, and various other client-side methods are implemented as application programs 822 readable by the computational system 800.

A set of these instructions and/or code might be stored on a computer readable storage medium 810*b*. In some embodiments, the computer readable storage medium 810*b* is the storage device(s) 808 described above. In other embodiments, the computer readable storage medium 810*b* might be incorporated within a computer system. In still other embodiments, the computer readable storage medium 810*b* might be separate from the computer system (i.e., a removable medium, such as a compact disc, etc.), and or provided in an installation package, such that the storage medium can be used to program a general purpose computer with the instructions/code stored thereon. These instructions might take the form of executable code, which is executable by the computational system 800 and/or might take the form of source and/or installable code, which, upon compilation and/or installation on the computational system 800 (e.g., using any of a variety of generally available compilers, installation programs, compression/decompression utilities, etc.), then takes the form of executable code. In these embodiments, the computer readable storage medium 810*b* may be read by a computer readable storage media reader 810*a*.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In some embodiments, one or more of the input devices 804 may be coupled with an audio interface 830-1. The audio interface 830-1 may be configured to receive a music contribution 102-1 by interfacing with a microphone, instrument, digital audio device, or other audio signal or file source, for example physically, optically, electromagnetically, etc. In other embodiments, one or more of the input devices 804 may be coupled with a score interface 830-2. The score interface 830-2 may be configured to receive a score contribution 102-2 by interfacing with a camera, scanner, digital imaging device, or other digital image source.

Further, in some embodiments, one or more of the output devices 806 may be coupled with an audio output device 106-1. The audio output device 106-1 may be configured to output audio signal data generated by embodiments of the invention to one or more systems or devices capable of handling that data, for example a speaker, audio component, digital-to-analog converter, compact disc writer, etc. In other embodiments, one or more of the output devices 806 may be coupled with a score output device 106-2. The score output device 106-2 may be configured to output score representation data generated by embodiments of the invention to one or more systems or devices capable of handling that data, for example score transcription software, score publication systems, file storage devices, etc.

In one embodiment, the invention employs a computer system (such as the computational system 800) to perform methods of the invention. According to a set of embodiments, some or all of the procedures of such methods are performed by the computational system 800 in response to the processor 802 executing one or more sequences of one or more instructions (which might be incorporated into the operating system 824 and/or other code, such as an application program 822) contained in the working memory 818. Such instructions may be read into the working memory 818 from another machine-readable medium, such as one or more of the storage device(s) 808 (or 810). Merely by way of example, execution of the sequences of instructions contained in the working memory 818 might cause the processor(s) 802 to perform one or more procedures of the methods described herein.

The terms "machine readable medium" and "computer readable medium," as used herein, refer to any medium that participates in providing data that causes a machine to operate in a specific fashion. In an embodiment implemented using the computational system 800, various machine-readable media might be involved in providing instructions/code to processor(s) 802 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) (1608 or 810). Volatile media includes, without limitation, dynamic memory, such as the working memory 818. Transmission media includes coaxial cables, copper wire, and fiber optics, including the wires that comprise the bus 826, as well as the various components of the communication subsystem 814 (and/or the media by which the communications subsystem 814 provides communication with other devices). Hence, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 802 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computational system 800. These signals, which might be in the form of electromagnetic signals, acoustic signals, optical signals, and/or the like, are all examples of carrier waves on which instructions can be encoded, in accordance with various embodiments of the invention.

The communications subsystem 814 (and/or components thereof) generally will receive the signals, and the bus 826 then might carry the signals (and/or the data, instructions, etc. carried by the signals) to the working memory 818, from which the processor(s) 802 retrieves and executes the instructions. The instructions received by the working memory 818 may optionally be stored on a storage device 808 either before or after execution by the processor(s) 802.

It will be appreciated that many implementations of the system are possible according to the invention which may or may not incorporate the components or functionality described with respect to FIG. 8. In some embodiments, the system is implemented as a dedicated device. The device may include one or more internal microphones, configured to sense acoustic pressure and convert it into a search input for use by the system. Alternately, the device may include one or more music input ports for interfacing with external microphones, media devices, data stores, or other audio sources. In certain of these embodiments, the device may be a handheld or portable device. In other embodiments, the system may be implemented in a multi-purpose or general purpose device (e.g., as software modules stored on a computer-readable medium for execution by a computer). In certain of these embodiments, the audio source may be a sound card, external microphone, or stored audio file. The input is then generated and provided to the system.

Other embodiments of the system may be implemented as a simplified or monaural version for operation as a music dictation device, which receives audio from users who play an instrument or sing a certain tune or melody or a part thereof into one microphone. In the single-microphone arrangement, the system subsequently translates the recorded music from the one microphone into the corresponding music score. This may provide a musical equivalent to text-to-speech software that translates spoken words and sentences into computer-readable text. As a sound-to-notes conversion, the tune or melody will be registered as if one instrument where playing.

It will be appreciated that different implementations of the system may also include different types of interfaces and functions relating to compatibility with users and other systems. For example, input ports may be provided for line-level inputs (e.g., from a stereo system or a guitar amplifier), microphone inputs, network inputs (e.g., from the Internet), or other digital audio components. Similarly, output ports may be provided for output to speakers, audio components, computers, and networks, etc. Further, in some implementations, the system may provide user inputs (e.g., physical or virtual keypads, sliders, knobs, switches, etc.) and/or user outputs (e.g., displays, speakers, etc.). For example, interface capabilities may be provided to allow a user to listen to recordings or to data extracted from the recordings by the system.

In one embodiment, the features of the invention are implemented in software, comprising an application that can be installed on a digital computer. The software implementation preferably provides input and output interfaces for the performer. That is, the host computer in which the software is installed typically includes a display for producing a visual presentation of a music score that the performer can read, to sing along or play the performer's musical instrument. The computer also typically includes an input interface, such as a microphone, for recording the performer's session, and includes an output interface, such as speakers, to enable the performer to listen to the recorded performance. The computer implementation can include image capture, wherein a music score comprising notes on a staff can be digitized via an optical input means and then entered into the computer. The digitized music score can be interpreted via OCR techniques, with the resulting interpreted data being processed so as to produce a synthesized audio rendition of the music score, including when appropriate a synthesized vocal rendition matching words with appropriate pitch, such that the audio rendition is synchronized with a visual presentation of the score. In the additional detailed descriptions provided below, the computer software implementation is referred to as a "Level X" implementation or is referred to as the "eMuse X" product (the name "eMuse" referring to a product embodiment from MuseAmi, Inc. of Princeton, N.J., USA, the assignee of all rights in the invention).

In another embodiment, the features of the invention are embodied in a handheld device that can include a display, an input interface, audio and visual output interfaces, and OCR image interpretation interfaces. The handheld device implementation includes a variety of convenient user control knobs and mechanisms for convenient navigation of the device functions. The display supports a visual presentation of menu options for selection of functions by the user.

As described further below, a computing device interprets and processes music score data by receiving the music score data from an external source and subsequently producing a synthesized audio rendition of the music score data and a synchronized visual presentation of music score.

The external source can consist of a network data source that provides the music score data to the computing device over a network connection. The network connection can consist of communication between the computing device and the network over a wireless connection.

The music score data can be read from a recorded medium by accepting the recorded medium into a reader of the computing device that then obtains the music score data from the recorded medium. The recorded medium contains sufficient data for synthesized audio rendition in accordance with a MIDI specification for synthesized music production. That is, the computing device can receive data that specifies a music score and can generate or synthesize corresponding musical tones in a selected tempo, timbre, clef, key signature, time signature, and the like. The recorded medium can comprise a flash memory device.

The computing device can be provided with ability for recording a user performance of a music score and providing playback of the recorded user performance. The user performance playback can occur independently of the synthesized music score rendition, or can occur simultaneously. In addition, the user performance playback can be provided along with a visual representation of the musical notes corresponding to the recorded user performance. In this way, a "music dictation" feature is provided.

In one alternative, the music score data used by the device to generate both the synthesized audio rendition and the synchronized visual presentation of the music score can be obtained by the device optically capturing a digital image of a music score, then interpreting and processing the digital information to produce a collection of data representing appropriate music notes, thus generating data that corresponds to the music score.

In addition, music contextual information can be provided that determines characteristics of the synthesized audio rendition of the music score data, all of which may be adjusted by the user. Such music contextual information can include multiple key signatures, time signatures timbre, tempo and expressive terms such as legato, crescendo, ritard, etc.

In another alternative, producing an audio playback of the music score data and a visual presentation of musical notes is effected through communication with a network data source. If desired, the network data source provides the music score data to the computing device. In yet another alternative, the network data source can provide to the computing device the music contextual information that determines music characteristics of the synthesized audio rendition of the music score data. Also, the network data source can provide the music context information over a wireless connection.

In one alternative, producing a synthesized audio rendition of the music score data and a synchronized visual presentation of music score is effected by inserting a recorded medium into a reader of the computing device. If desired, the computing device obtains the music score data from the recorded medium, and the recorded medium can also provide the music contextual information to the computing device for determining music characteristics of the synthesized audio rendition of the music score data.

One optional feature is to provide recording of the user's instrumental and/or vocal performance of the music score. Another alternative is to produce a synthesized audio rendition in accordance with a MIDI specification. In addition, producing the visual presentation can consist of displaying the music score synchronized with the corresponding synthesized audio rendition. Another option is to provide simultaneous synchronized playback, playback of both the visual presentation and audio rendition of the music score data and both the audio component of the recorded user performance and a synchronized corresponding visual display of the music score generated by the user performance.

In accordance with the invention, a computing device can optically digitally capture a music score and interpret the digital image, generating music score data for the computing device that corresponds to the digitally captured music score, and produce a synthesized audio rendition of the music score data and a synchronized visual presentation of music score. The computing device can receive music contextual information that is used by the computing device to determine music characteristics of the synthesized audio rendition of the music score data. Similarly to the alternative embodiment described above, the music contextual information can include multiple key signatures, time signatures timbre, tempo and expressive terms such as legato, crescendo, ritard, etc. that can be selected by the user to determine the music characteristics of the synthesized audio rendition of the music score data. As an option, the computing device identifies the music contextual information from the optically digitally captured music score, and optionally can obtain the music contextual information from a network data source. If desired, the network data source provides the music contextual information over a wireless connection with the computing device.

The computing device can be provided with its own loudspeakers for audio playback of synthesized renditions and/or performances recorded by the user. Additionally, the device can include an output jack for connection to headphones or external loudspeakers or the like, and can also be provided with wireless transmission capability that allows the device to transmit an audio performance to a wireless sound playback system (such as a home stereo system that has been enabled with wireless components). The device has sufficient computing memory to enable it to store musical passages of predetermined length.

The additional detailed descriptions below refer to various implementations of features in the handheld device implementation and are referred to as "Level 1" and "Level 2" or "eMuse 1" and "eMuse 2", respectively.

The following discussion describes music playback software that can be installed on a range of digital computing devices, and also describes embodiments of a handheld sheet music reading device, herein collectively referred to as the eMuse product.

Figure 9:
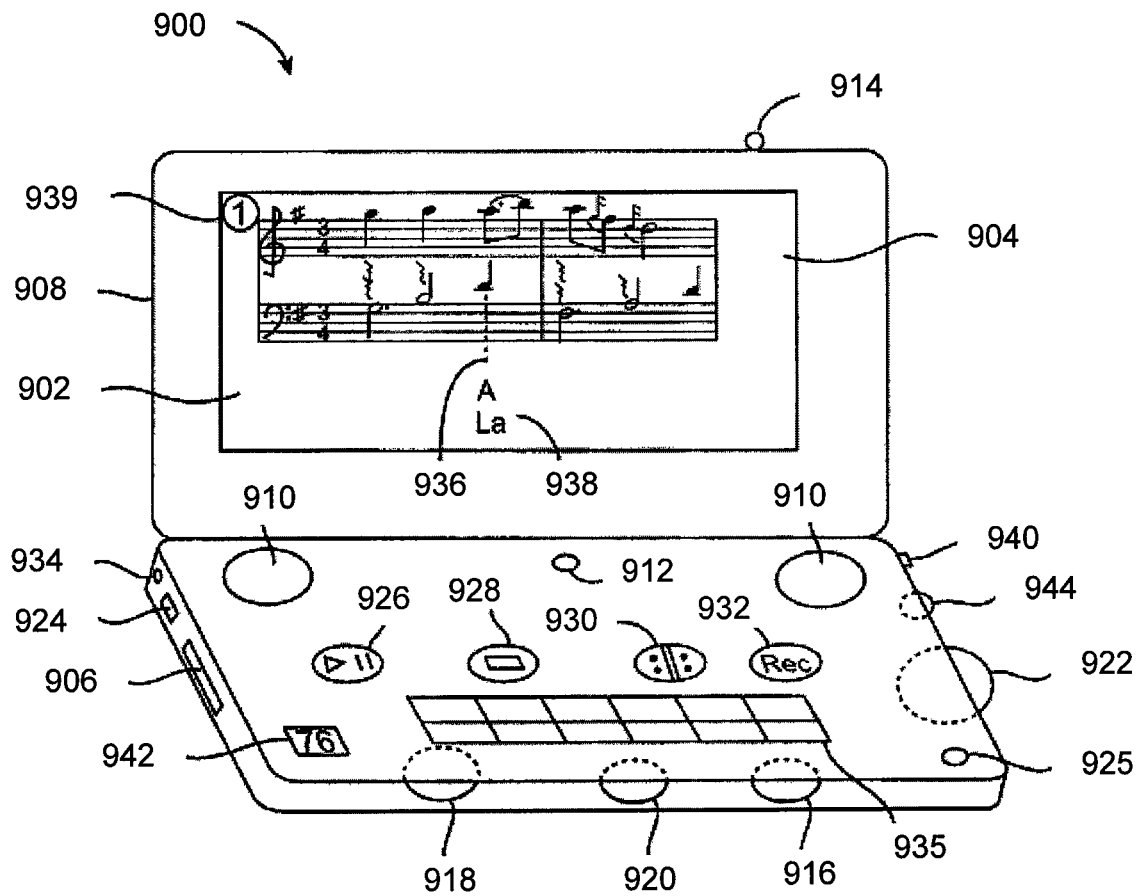
FIG. 9 shows an illustrative embodiment of a product according to the invention, as a hand-held consumer electronic device.

FIG. 9 shows an illustrative embodiment of a product as a hand-held, battery powered "point and shoot" consumer electronic device 900 that captures an image of a selected musical passage—either a few measures or even an entire page—from sheet music, formats and encodes the passage digitally, then plays the selected passage, all virtually instantaneously in real time. The playback sound is instrument-specific, playing in a timbre (e.g., the sound of a piano, violin, flute, etc.) selected by the user. Multiple timbres can be played simultaneously. The device 900 is designed to recognize music variables, such as key signature, meter, volume, and tempo, and account for music prose terms, such as forte, piano, cress., legato, and the like. An LCD screen 902 displays the music passage 904 as the device is playing it back, with each played note highlighted in a unique color so as to distinguish it from the rest of the music score.

The FIG. 9 device 900 incorporates a digital "music card" feature, which supports insertion of a data card (not illustrated) that is encoded with one or more recorded or downloaded music pieces, and allows for quick reference to specific measures. The data card can comprise recordable media such as typically used by cellular telephones and digital cameras. The data card is received into a card slot 906 of the device 900. The device 900 also works with digital data representing encoded music pieces. Downloaded files can also be saved within memory of the device. The encoded music pieces provide an enriched listening experience, allowing for quick reference to specific measures of the music score.

A record/playback feature of the device 900 allows the user to immediately evaluate a recorded performance with reference to the music score. That is, the device 900 can record a user's performance of the music piece and play back the user's performance, along with (or simultaneous with) playback of the received music piece. The user performance playback can be presented with a corresponding visual presentation, providing a "music dictation" feature. Both a metronome and a music tone tuner capability are also incorporated into the device, and the device can be adjusted for a "music minus one" feature. In a multi-staff or multi-part piece of music, the "music minus one" feature allows the user to determine which part(s) of the piece will be played back by the MIDI interface. This allows the user to play/sing a specific part along with the device.

FIG. 9 shows the device 900 as a hand-held device with a flip-top 908 having the LCD screen 902 incorporated in the underside of the lid or top 908. The device also incorporates a speaker 910 for music playback (a stereo pair are illustrated in FIG. 9) and a microphone 912 for recording a user performance. Image capture capability can be implemented as shown in FIG. 9, wherein the flip-top 908 includes a camera system comprising an optical lens mounted in the outside surface of the flip-top 908 and triggered by a lens shutter button 914 for purposes of image capture. Various user interface controls are provided, shown as thumbwheels for adjusting volume 916, playback tempo 918, menu navigation 920, and position 922. The device 900 can be provided with a USB port 924, for more easily connecting with a network or other devices. An on/off switch 925 turns the device 900 on and off.

Control buttons are also provided for controlling, as illustrated in FIG. 9, functions involving renditions of the music score (synthesized performance) and playback of the user's performance. FIG. 9 shows exemplary control buttons for the functions of play/pause 926, stop 928, next/reset 930, and record 932. FIG. 9 also shows a metronome readout display 934 that shows a timing indicator and is correlated with the playback tempo 918. Selection of the metronome function, and the other features of the device 900, is accomplished with menu navigation of the LCD screen 902 in conjunction with operation of the menu thumbwheel 920 and/or the position thumbwheel 922. Selection can be achieved through operation of the next/reset control button 930. A keyboard or keypad 935 can be used for input via dedicated function keys of the keypad 935 or alphanumeric input from the keypad 935. On the LCD screen 902, graphical images of music notes from the music passage 904 are provided, moving across the screen, with individual notes appearing on-screen or being highlighted in the display as the notes are played. The display preferably provides a music staff image that is extended during playback so a predetermined number of notes or measures of music are displayed as the music passage 904 is played.

In one embodiment of the device 900, a digital camera system 914 captures an image of a passage (a single note, several measures, or even an entire page) within a music score. The digital camera can be built into the device 900 and can comprise a lens and image transducer combination that will be familiar to those skilled in the art. The LCD screen 902 allows the user to determine exactly which measures are captured. The device can read a single stave music line, duets, trios, quartets, or even a full conductor's score. The device 900 offers multiple simultaneous timbres.

The OCR module may receive the "photograph" of the music excerpt, comprising digitized image data. Important additional music contextual information, such as key signature and meter, is also sent to the OCR module, via a music score digital image or via a "cheat sheet" (e.g., downloaded from a website, then transmitted wirelessly or via the USB port to the device—see below) that lists all available key signatures and time signatures. The "cheat sheet" may also include a section from which the user can select the desired timbre(s), or the user can manually specify (input) the desired timbre(s).

In another embodiment, the device 900 may provide MIDI synthesizer functionality. The OCR module may send the sound information to the MIDI module that produces synthesized sound. This offers adjustable timbre; the user specifies the type of instrument (piano, violin, flute, etc.) for the particular music passage or piece. The module also offers adjustable tempo so that the user can hear the passage slower (or faster) than the metronomic (if any) indicated in the score without any alteration of pitch. The device plays back through its own small loudspeaker, and also has a headphone jack 934 and wireless capability for headphones and/or external speakers.

In various embodiments, the device 900 may provide for certain visual display capabilities. For example, the LCD screen 902 may help the user make sure that the measures being captured (photographed) are the measures that are intended to be heard. The LCD screen 902, complete with a cursor 936, displays the music passage 904 as the passage is played back, either from a passage that was photographed by the user or from a music-card with stored data. The cursor indicates the exact music position in the score of the current note(s) being played as the music passage 904 is played in real time, regardless of the specified tempo. Rather than a traditional type of moving cursor, the cursor 936 can instead indicate the note being played by highlighting the note (e.g., making it brighter) or by giving it a different display color from the other notes as it is played. Another option is for the LCD screen 902 to show the names of the notes (both in English and in solfege) 938, particularly for a single-line music passage 904. If the music passage 904 is comprised of multiple simultaneous music lines, the user can specify the line for which the names of notes 938 are displayed.

The LCD screen 902 may also show an indicator of the music passage 904 selected for play. The indicator is referred to as the passage marker 939. In FIG. 9, the passage marker 939 is shown as numeral "1" enclosed in a circle. The numerical "1" indicates the first measure of the music passage 904 is currently being displayed, and the circle indicates that playback was initiated at the first measure. If playback continues to the next measure, a "2" would be displayed in place of the "1", but the "2" would not be circled.

In another embodiment, the device 900 may provide recording sensor functionality. For example, the microphone 912 may be configured so that the user can record him/herself playing (and/or singing) the music passage 904 in question and immediately play back the recording to compare the user's performance with that of the device 900 (that is, of a previously recorded or synthesized rendition). This feature may be helpful for students to make adjustments in notes, tuning, rhythm, and dynamics. As noted above, a user performance can be recorded via the microphone 912 to provide the "music dictation" feature.

Some embodiments of the device 900 provide wireless capabilities. For example, the device 900 may be operable to permit wireless communications with networks and other wireless-enabled device, and to permit downloads of encoded music files with contextual information. The features described herein can be provided, for example, by eMuse software installed to a wireless platform, such as a PDA or smartphone, for portable music interaction. In addition, the device 900 may use computing and memory (and playback audio) of a home PC and/or stereo system, or another component.

In another embodiment, a user's performance may be recorded by the device 900 and the user's performance may be subjected to a music note interpretation processing to generate data from which is produced a display of the music notes corresponding to the user's recorded performance. In this way, the device can take "musical dictation" and can convert a live audio performance by the user into a visual display of the music score corresponding to the performance. Thus, the music interpretation features of the device can process both music score data received by optical or electronic network communication, and can process music score data produced by a user's live performance, captured by a microphone.

The software described herein can be used in a variety of platforms. In one embodiment, aspects of eMuse are embedded in a high-end cell phone in which the cell-phone camera photographs a specific passage in a music score. The captured image is then compressed and sent to a remote server, which performs OCR operations on the image data to interpret the image into corresponding music note information. The server then sends back both a midi file and a graphic file, enabling this version of eMuse to play the music that was photographed and display the notes on the LCD as they are played.

Figure 10:
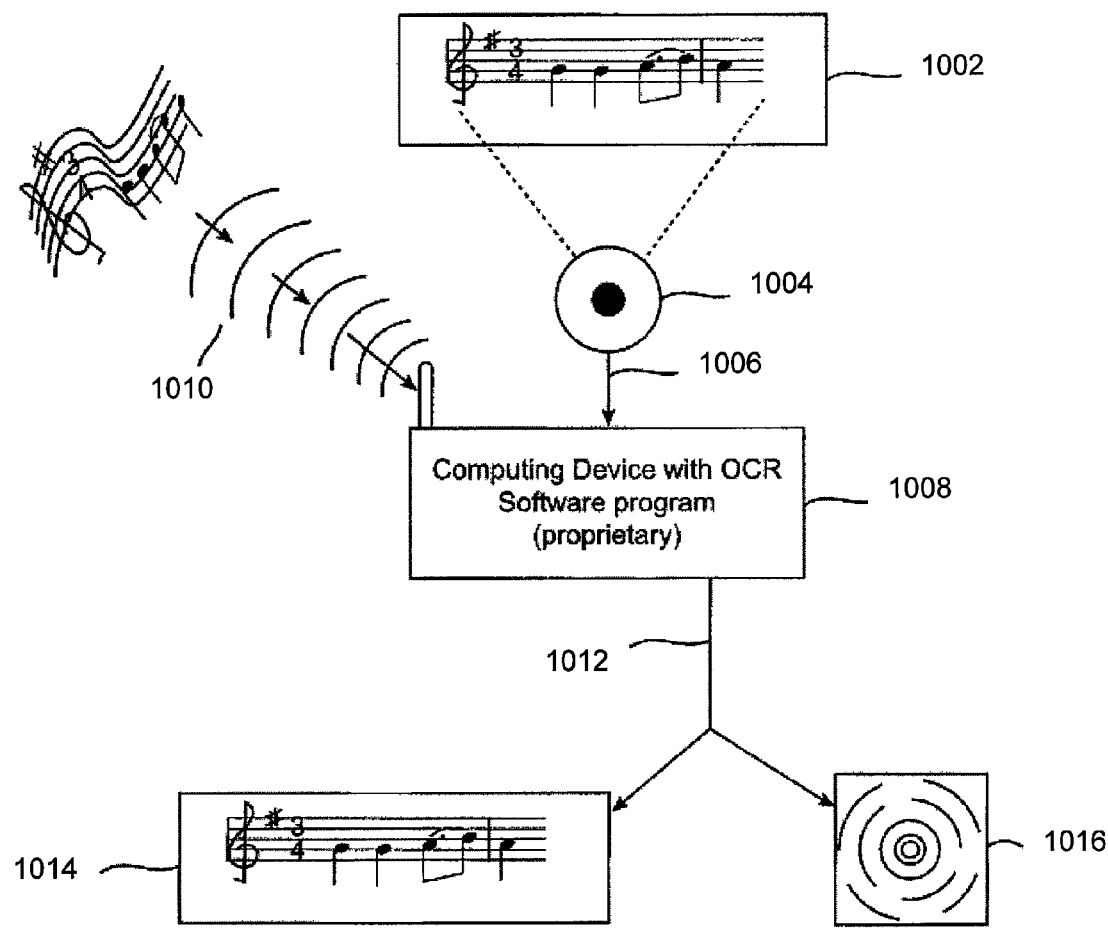
FIG. 10 provides a simplified process flow diagram that illustrates operation of an embodiment of a device similar to the one shown in FIG. 9.

FIG. 10 provides a simplified illustration of a process flow diagram that illustrates operation of an embodiment of the device 900 in FIG. 9. In an initial operation, a digital representation of a music score is provided to the device. The digital representation can be received by a visual presentation 1002 to the device, such as a printed page, which is digitally captured using a digital image capture device 1004, such as a digital camera that operates with the device. The digital data derived from optical input 1006 is then provided to a note data interpretation process 1008. Alternatively, the digital representation of the music score can be provided electronically 1010, such as by wireless transmission of digital data corresponding to the music score or wired transmission of the data over a network, or input through a storage media such as a memory card or other media. The electronically received version of the music score 1010 is then provided to the note data interpretation process 1008.

The note data interpretation process 1008 receives the digital data corresponding to the music score and processes it to produce a set of music notes and concomitant information sufficient to specify the music score and enable its reproduction by suitable hardware. The process 1008 comprises a processor trained with machine learning techniques to recognize the music score digital data 1006, 1010 and produce appropriate transformed data. The process 1008 can be trained, for example, using neural network software engineering techniques to increase the accuracy of the interpretation process up to substantially 100% accuracy. In accordance with the present invention, the incoming music score data must be produced for audio and visual presentation to the user in real time, and therefore interpretation of the incoming music score data must be in real time and must approach 100% accuracy of interpretation (transformation). The process 1008 utilizes optical character recognition (OCR) techniques, but is adapted for music note recognition and interpretation of digital data (electronic or optical scan derived) to an appropriate representation.

The interpretation process output 1012 comprises a visual presentation of the music score, which is provided to a display screen 1014 of the device, and also a synthesized audio rendition of the music score, which is provided to appropriate device systems and hardware 1016 for audio presentation through loudspeakers of the device, or the like.

Other Capabilities

It will be appreciated that many other capabilities are possible in addition to those described above. One set of additional processing capabilities involves increasing the amount of customizability that is provided to a user. For example, embodiments may allow for enhanced customizability of various components and methods of the invention.

In some embodiments, the various thresholds, windows, and other inputs to the components and methods may each be adjustable for various reasons. For example, the user may be able to adjust the key extraction window, if it appears that key determinations are being made too often (e.g., the user may not want brief departures from the key to show up as a key change on the score). For another example, a recording may include a background noise coming from 60 Hz power used during the performance on the recording. The user may wish to adjust various filter algorithms to ignore this 60 Hz pitch, so as not to represent it as a low note on the score. In still another example, the user may adjust the resolution of music bins into which pitches are quantized to adjust note pitch resolution.

In other embodiments, less customizability may be provided to the user. In one embodiment, the user may be able to adjust a representational accuracy level. The user may input (e.g., via a physical or virtual slider, knob, switch, etc.) whether the system should generate more accurate or less accurate score representations, based on one or more parameter, including selecting the accuracy for individual score-representational elements, like tempo and pitch.

For example, a number of internal settings may work together so that the minimum note value is a sixteenth note. By adjusting the representational accuracy, longer or shorter durations may be detected and represented as the minimum value. This may be useful where a performer is not performing strictly to a constant beat (e.g., there is no percussion section, no metronome, etc.), and too sensitive a system may yield undesirable representations (e.g., triple-dotted notes). As another example, a number of internal settings may work together so that the minimum pitch change is a half-step (i.e., notes on the chromatic scale).

In still other embodiments, even less customizability may be provided to the user. In one embodiment, the user may input whether he or she is a novice user or an advanced user. In another embodiment, the user may input whether the system should have high or low sensitivity. In either embodiment, many different parameters in many components or methods may adjust together to fit the desired level. For example, in one case, a singer may wish to accurately transcribe every waver in pitch and duration (e.g., as a practice aid to find mistakes, or to faithfully reproduce a specific performance with all its aesthetic subtleties); while in another case, the singer may wish to generate an easy to read score for publication by having the system ignore small deviations.

In certain embodiments, the level of customizability, types of functionality, and other aspects of the systems or methods may be dictated in different ways. In one embodiment, the user may select certain preferences, manipulate certain physical or virtual controls, or otherwise actively interact with the system to determine those aspects. In another embodiment, the system may automatically select various aspects (e.g., from login and/or profile information relating to the user, from the user's pattern of use of the system, etc.).

Another set of additional capabilities involves using different types of input to refine or otherwise affect the processing of the input audio signal. One embodiment uses one or more trained artificial neural networks (ANN's) to refine certain determinations. For example, psycho-acoustical determinations (e.g., meter, key, instrumentation, etc.) may be well-suited to using trained ANN's.

Another embodiment provides the user with the ability to layer multiple tracks (e.g., a one-man band). The user may begin by performing a drum track, which is processed in real time using the system of the invention. The user may then serially perform a guitar track, a keyboard track, and a vocal track, each of which is processed. In some cases, the user may select multiple tracks to process together, while in other cases, the user may opt to have each track processed separately. The information from some tracks may then be used to refine or direct the processing of other tracks. For example, the drum track may be independently processed to generate high-confidence tempo and meter information. The tempo and meter information may then be used with the other tracks to more accurately determine note durations and note values. For another example, the guitar track may provide many pitches over small windows of time, which may make it easier to determine key. The key determination may then be used to assign key pitch determinations to the notes in the keyboard track. For yet another example, the multiple tracks may be aligned, quantized, or normalized in one or more dimension (e.g., the tracks may be normalized to have the same tempo, average volume, pitch range, pitch resolution, minimum note duration, etc.). Further, in some embodiments of the "one-man band", the user may use one instrument to generate the audio signal, then use the system or methods to convert to a different instrument or instruments (e.g., play all four tracks of a quartet using a keyboard, and use the system to convert the keyboard input into a string quartet). In some cases, this may involve adjusting the timbre, transposing the music lines, and other processing.

Still another embodiment uses inputs extrinsic to the music input signal to refine or direct the processing. In one embodiment, genre information is received either from a user, from another system (e.g., a computer system or the Internet), or from header information in the digital audio file to refine various cost functions. For example, key cost functions may be different for blues, Indian classical, folk, etc.; or different instrumentation may be more likely in different genres (e.g. an "organ-like" sound may be more likely an organ in hymnal music and more likely an accordion in Polka music).

Another set of additional capabilities involves using information across multiple components or methods to refine complex determinations. In one embodiment, the output of the instrument identification method is used to refine determinations based on known capabilities or limitations of the identified instruments. For example, say the instrument identification method determines that a music line is likely being played by a piano. However, the pitch identification method determines that the music line contains rapid, shallow vibrato (e.g., warbling of the pitch within only one or two semitones of the detected key pitch designation). Because this is not typically a possible effect to produce on a piano, the system may determine that the line is being played by another instrument (e.g., an electronic keyboard or an organ).

Yet another set of additional capabilities involves using the various functions of the systems and methods for handling ring tones (e.g., for cell phones, voice-over-internet-protocol phones, and other devices). In one embodiment, deconstructed music elements are manipulated to fit the specifications of a ring tone. For example, some devices may have limitations on the bandwidth for a ring tone, the depth of polyphony, and the length. Therefore, in some cases, the system may automatically adjust a search input or stored search data to fit the ring tone specifications, or may prompt a user with the information desired or required to guide the user according to those specifications. The user may then be able to, for example, listen to the ring tone, download the ring tone to a cell phone or other device (or a storage location), share the ring tone with others over the network, auction or sell the ring tone, etc.

Still another set of additional capabilities involves configuring audio or score output as a product for sale or auction. For example, a search portal may include music auctioning functionality or music store functionality. The shopping functions may include capabilities relating to royalty and pricing, voting (e.g., featuring the most popular over a given time span, or the winner gets special featuring on the portal), search by device or specification, different payment processing, secure e-commerce, copyright protection and digital rights management, etc.

And another set of additional capabilities involves using deconstructed or received music elements to search for similar works to avoid (or detect) copyright infringement. This capability may require additional modules to be incorporated into the systems or additional steps to be incorporated into the methods to tailor a search for this particular result. For example, in some embodiments, information relating to copyright laws and policies may be provided to help the systems and methods determine if there is potential infringement.

It will be appreciated that many such additional processing capabilities are possible, according to the invention. Further, it should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. Further, the headings provided herein are intended merely to aid in the clarity of the descriptions of various embodiments, and should not be construed as limiting the scope of the invention or the functionality of any part of the invention. For example, certain methods or components may be implemented as part of other methods or components, even though they are described under different headings.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

What is claimed is:

1. A computer method of performing a music search, the method comprising:
   receiving a music query that specifies a music element;
   generating a set of search parameters based on the music element specified by the received music query;
   directing the set of search parameters against a database comprising a plurality of data records, each data record being associated with a music piece and a set of music elements relating to the music piece, wherein:
      the set of music elements associated with at least one data record comprises data deconstructed from the at least one music piece by determining music micro-elements and determining music macro-elements based on the determined music micro-elements;
   identifying a set of matching data records in the database, the set of matching data records comprising data records that match the set of search parameters;
   identifying a set of matched music pieces in the database, the set of matched music pieces comprising music pieces that are associated with the set of matching data records; and
   producing search output comprising the matched music pieces arranged in a ranked list.

2. The method of claim 1, further including:
   receiving at least one additional music query;
   generating a deconstructed additional music query;
   directing the deconstructed additional music query against a selected database containing deconstructed music pieces;
   identifying deconstructed music pieces that match the deconstructed additional music query; and
   producing search output comprising the identified music pieces arranged in a ranked list.

3. The method of claim 2, wherein directing comprises directing the deconstructed additional music query against a set of music pieces identified as output of a prior music query.

4. The method of claim 2, wherein the ranked list is arranged according to weighted values.

5. The method of claim 1, wherein the deconstructed data comprises at least one music element that relates to attributes of a note of music.

6. The method of claim 1, wherein receiving the music query comprises:
   receiving a music query that specifies a music macro-element; and
   generating the set of search parameters comprises generating the set of search parameters based on the music macro-element specified by the received music query.

7. The method of claim 1, wherein generating the set of search parameters comprises:
   deconstructing the received music query into a set of music elements; and
   generating the set of search parameters based on the music elements deconstructed from the received music query.

8. A computer system that performs music search, the system comprising:
   an input interface adapted to receive a music query;
   a query input processor adapted to generate a deconstructed music query comprising music elements of the received music query; and
   a query engine adapted to direct the deconstructed music query against a selected database comprising a plurality of data records, each data record being associated with a music piece and a set of music micro-elements relating to the music piece, wherein the set of music micro-elements associated with at least one data record comprises data deconstructed from the at least one musical music piece, to identify deconstructed music pieces of the database that match the deconstructed music query by generating at least one music macro-element from the set of music micro-elements associated with at least one data record, and to produce search output comprising the identified music pieces arranged in a ranked list.

9. The system of claim 8, wherein:

the input interface receives at least one additional music query;

the query input processor generates a deconstructed additional music query; and the query engine directs the deconstructed additional music query against a selected database containing deconstructed music pieces, identifies deconstructed music pieces that match the deconstructed additional music query, and produces search output comprising the identified music pieces arranged in a ranked list.

10. The system of claim 9, wherein the system directs the additional music query against a set of music pieces identified as output of a prior music query.

11. The system of claim 9, wherein the ranked list is arranged according to weighted values.

12. The system of claim 8, wherein the deconstructed data comprises at least one music element that relates to attributes of a note of music.

13. A computer-readable storage medium having a computer-readable program embodied therein for directing operation of a music-based search engine, the computer-readable program including instructions for music-based searching in accordance with the following:

receiving a music query that specifies a music element;

generating a set of search parameters based on the music element specified by the received music query;

directing the set of search parameters against a database comprising a plurality of data records, each data record being associated with a music piece and a set of music elements relating to the music piece, wherein:

the set of music elements associated with at least one data record comprises data deconstructed from the at least one music piece by determining music micro-elements and determining music macro-elements based on the determined music micro-elements;

identifying a set of matching data records in the database, the set of matching data records comprising data records that match the set of search parameters;

identifying a set of matched music pieces in the database, the set of matched music pieces comprising music pieces that are associated with the set of matching data records; and producing search output comprising the matched music pieces arranged in a ranked list.

14. The computer-readable storage medium of claim 13, wherein the deconstructed data comprises at least one music element that relates to attributes of a note of music.

* * * * *